US012695306B2

(12) United States Patent
Nakagawa et al.

(10) Patent No.: US 12,695,306 B2
(45) Date of Patent: Jul. 28, 2026

(54) POWER CONTROL SYSTEM, POWER CONTROL DEVICE, AND PROGRAM

(71) Applicant: DAIKIN INDUSTRIES, LTD., Osaka (JP)

(72) Inventors: Yoshihiro Nakagawa, Osaka (JP); Shuji Furui, Osaka (JP); Takuya Nakao, Osaka (JP); Nobuki Matsui, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 500 days.

(21) Appl. No.: 18/029,228

(22) PCT Filed: Aug. 13, 2021

(86) PCT No.: PCT/JP2021/029820
§ 371 (c)(1),
(2) Date: Mar. 29, 2023

(87) PCT Pub. No.: WO2022/070631
PCT Pub. Date: Apr. 7, 2022

(65) Prior Publication Data
US 2023/0369858 A1     Nov. 16, 2023

(30) Foreign Application Priority Data

Sep. 30, 2020    (JP) ................................. 2020-165450

(51) Int. Cl.
| | |
|---|---|
| *H02J 3/00* | (2026.01) |
| *G06Q 50/06* | (2024.01) |
| *H02J 13/00* | (2026.01) |
| *H02J 13/13* | (2026.01) |

(52) U.S. Cl.
CPC .............. *H02J 3/004* (2020.01); *G06Q 50/06* (2013.01); *H02J 13/1321* (2026.01)

(58) Field of Classification Search
CPC ................. H02J 3/0012; H02J 2310/60; H02J 13/00002; H02J 3/14; G06Q 10/04;
(Continued)

(56) References Cited

U.S. PATENT DOCUMENTS

| | | | |
|---|---|---|---|
| 7,274,975 B2 | 9/2007 | Miller | |
| 2016/0004297 A1* | 1/2016 | Kazuno | .................. G06Q 30/06 |
| | | | 713/320 |

(Continued)

FOREIGN PATENT DOCUMENTS

| | | | |
|---|---|---|---|
| JP | 5-328457 A | | 12/1993 |
| JP | 2001211547 A | * | 8/2001 |

(Continued)

OTHER PUBLICATIONS

International Search Report (PCT/ISA/210) issued in PCT/JP2021/029820, dated Oct. 19, 2021.
(Continued)

*Primary Examiner* — Mohammad Ali
*Assistant Examiner* — Dhruvkumar Patel
(74) *Attorney, Agent, or Firm* — Birch, Stewart, Kolasch & Birch, LLP

(57) ABSTRACT

A power control system for performing power control such that a target power set for a group including a plurality of consumers is not exceeded includes a server that generates control information, and a control device that controls power usage of an equipment device in accordance with the control information, and the server sets a limit value of power usage of each consumer in the group, generates control information including the limit value, and transmits, before a corresponding time period starts, the generated control information to the control device that performs control, and further the control device holds the received control information and controls, for each time period, power usage of an (Continued)

equipment device of the consumer in accordance with control information for the time period within control information held in the storage unit.

9 Claims, 10 Drawing Sheets

(58) Field of Classification Search
CPC ........... G06Q 30/0202; G06Q 30/0206; G06Q 30/04; Y02B 70/3225; Y04S 20/222
See application file for complete search history.

(56) References Cited

U.S. PATENT DOCUMENTS

2016/0197474 A1* 7/2016 Aisu ......................... H02J 3/14
700/297

2017/0070089 A1* 3/2017 Fukubayashi ..... H02J 13/00028

FOREIGN PATENT DOCUMENTS

| JP | 2006-60911 A | | 3/2006 |
|----|--------------|---|--------|
| JP | 2015-61500 A | | 3/2015 |
| JP | 2016123189 A | * | 7/2016 |

OTHER PUBLICATIONS

Extended European Search Report for European Application No. 21874934.9, dated Mar. 15, 2024.
English translation of the Malaysian Office Action and Search Report for Malaysian Application No. PI2023001683, dated Mar. 26, 2026.

* cited by examiner

100

CONTROL DEVICE

CONTROL INFORMATION
ACQUISITION UNIT                110

OPERATION INFORMATION
ACQUISITION UNIT                120

STORAGE UNIT                    130

CONTROL INSTRUCTION
GENERATION UNIT                 140

CONTROL INSTRUCTION
OUTPUT UNIT                     150

OPERATION INFORMATION
OUTPUT UNIT                     160

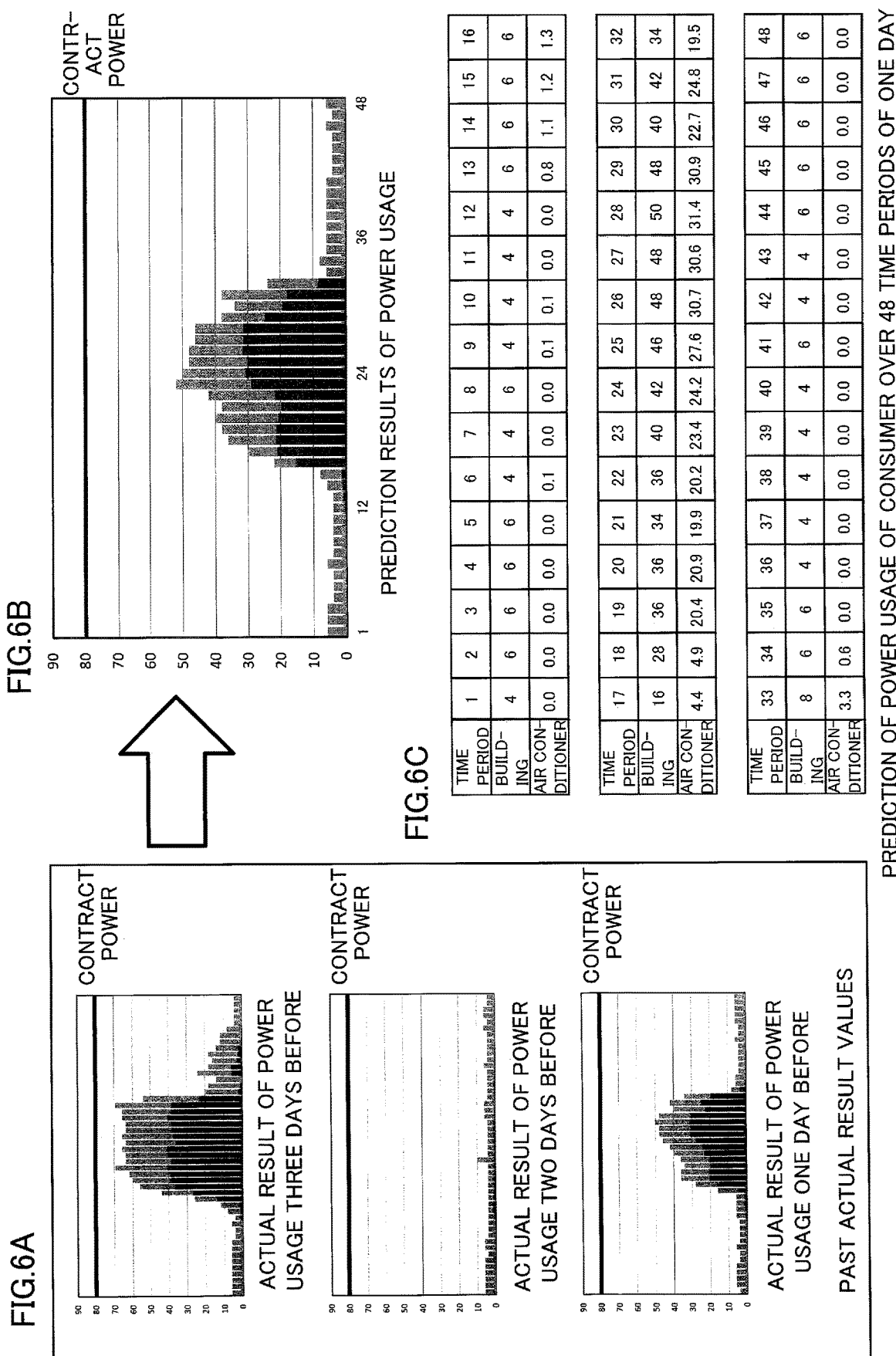

FIG.6A

ACTUAL RESULT OF POWER USAGE THREE DAYS BEFORE

ACTUAL RESULT OF POWER USAGE TWO DAYS BEFORE

ACTUAL RESULT OF POWER USAGE ONE DAY BEFORE

PAST ACTUAL RESULT VALUES

FIG.6B

PREDICTION RESULTS OF POWER USAGE

FIG.6C

| TIME PERIOD | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| BUILDING | 4 | 6 | 6 | 6 | 6 | 4 | 4 | 6 | 4 | 4 | 4 | 4 | 6 | 6 | 6 | 6 |
| AIR CONDITIONER | 0.0 | 0.0 | 0.0 | 0.0 | 0.0 | 0.1 | 0.0 | 0.0 | 0.1 | 0.1 | 0.0 | 0.0 | 0.8 | 1.1 | 1.2 | 1.3 |

| TIME PERIOD | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|
| BUILDING | 16 | 28 | 36 | 36 | 34 | 36 | 40 | 42 | 46 | 48 | 48 | 50 | 48 | 40 | 42 | 34 |
| AIR CONDITIONER | 4.4 | 4.9 | 20.4 | 20.9 | 19.9 | 20.2 | 23.4 | 24.2 | 27.6 | 30.7 | 30.6 | 31.4 | 30.9 | 22.7 | 24.8 | 19.5 |

| TIME PERIOD | 33 | 34 | 35 | 36 | 37 | 38 | 39 | 40 | 41 | 42 | 43 | 44 | 45 | 46 | 47 | 48 |
|---|---|---|---|---|---|---|---|---|---|---|---|---|---|---|---|---|
| BUILDING | 8 | 6 | 6 | 4 | 4 | 4 | 4 | 4 | 6 | 4 | 4 | 6 | 6 | 6 | 6 | 6 |
| AIR CONDITIONER | 3.3 | 0.6 | 0.0 | 0.0 | 0.0 | 0.0 | 0.0 | 0.0 | 0.0 | 0.0 | 0.0 | 0.0 | 0.0 | 0.0 | 0.0 | 0.0 |

PREDICTION OF POWER USAGE OF CONSUMER OVER 48 TIME PERIODS OF ONE DAY

CONTRACT POWER

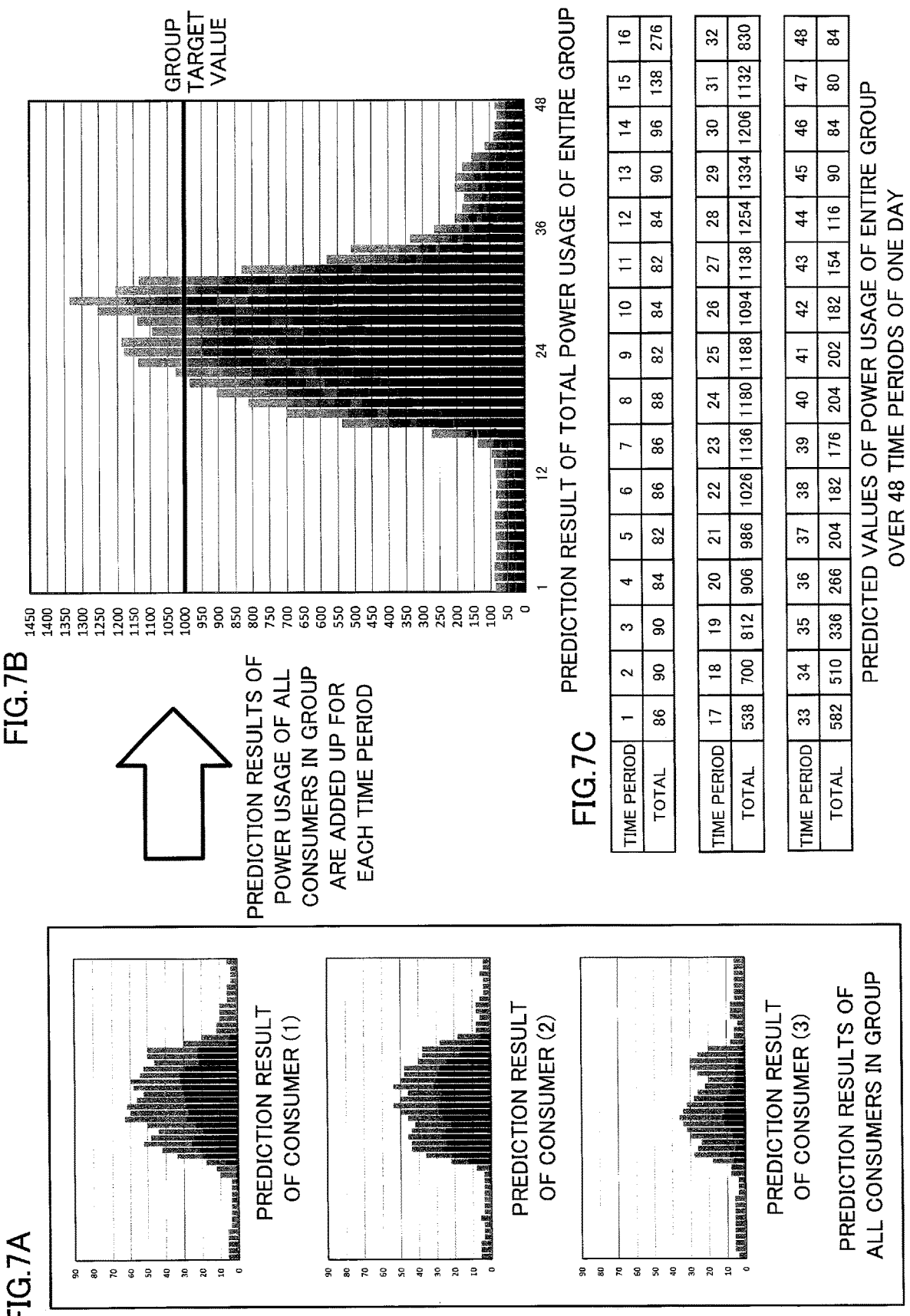

FIG.7A

PREDICTION RESULT OF CONSUMER (1)

PREDICTION RESULT OF CONSUMER (2)

PREDICTION RESULT OF CONSUMER (3)

PREDICTION RESULTS OF ALL CONSUMERS IN GROUP

PREDICTION RESULTS OF POWER USAGE OF ALL CONSUMERS IN GROUP ARE ADDED UP FOR EACH TIME PERIOD

FIG.7B

GROUP TARGET VALUE

FIG.7C    PREDICTION RESULT OF TOTAL POWER USAGE OF ENTIRE GROUP

| TIME PERIOD | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| TOTAL | 86 | 90 | 90 | 84 | 82 | 86 | 86 | 88 | 82 | 84 | 82 | 84 | 90 | 96 | 138 | 276 |

| TIME PERIOD | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|
| TOTAL | 538 | 700 | 812 | 906 | 986 | 1026 | 1136 | 1180 | 1188 | 1094 | 1138 | 1254 | 1334 | 1206 | 1132 | 830 |

| TIME PERIOD | 33 | 34 | 35 | 36 | 37 | 38 | 39 | 40 | 41 | 42 | 43 | 44 | 45 | 46 | 47 | 48 |
|---|---|---|---|---|---|---|---|---|---|---|---|---|---|---|---|---|
| TOTAL | 582 | 510 | 336 | 266 | 204 | 182 | 176 | 204 | 202 | 182 | 154 | 116 | 90 | 84 | 80 | 84 |

PREDICTED VALUES OF POWER USAGE OF ENTIRE GROUP OVER 48 TIME PERIODS OF ONE DAY

PREDICTION RESULT OF TOTAL POWER USAGE OF ENTIRE GROUP

GROUP TARGET VALUE

RESULT OF ALLOCATION OF LIMIT VALUES IN ENTIRE GROUP

GROUP TARGET VALUE

| TIME PERIOD | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| LIMIT VALUE | 93.1 | 88.9 | 88.9 | 95.3 | 97.6 | 93.1 | 93.1 | 91 | 97.6 | 95.3 | 65.1 | 63.5 | 59.3 | 139 | 77.3 | 164 | 94.2 | 83.9 | 85.4 | 88.3 | 89.3 | 80.6 | 65.8 | 61 |

| TIME PERIOD | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 |
|---|---|---|---|---|---|---|---|---|---|---|---|---|---|---|---|---|---|---|---|---|---|---|---|---|
| LIMIT VALUE | 74.1 | 82.9 | 84.4 | 85.1 | 78 | 75.2 | 75.4 | 99.6 | 156 | 188 | 119 | 50.2 | 52.3 | 58.6 | 60.6 | 52.3 | 39.6 | 44 | 34.6 | 46 | 88.9 | 63.5 | 66.7 | 63.5 |

LIMIT VALUES OF CONSUMER (1)

POWER CONTROL SYSTEM, POWER CONTROL DEVICE, AND PROGRAM

TECHNICAL FIELD

The present disclosure relates to a power control system, a power control device, and a program.

BACKGROUND ART

PTL 1 describes a demand management system including individual devices each provided for one of a plurality of power receivers, and a central device configured to be capable of communicating with the individual devices. The individual devices are configured to execute individual power-reception-amount reduction control for reducing individual amounts of power received by the power receivers in accordance with commands from the central device. The central device determines an individual device to be commanded to execute the individual power-reception-amount reduction control from among the plurality of individual devices and transmits a command to the individual device to be commanded, in such a manner that the total amount of power received is limited to a target total amount of power received or less when determining the excess of the total amount of power received.

CITATION LIST

Patent Literature

PTL 1: Japanese Unexamined Patent Application Publication No. 2006-60911

SUMMARY OF INVENTION

Technical Problem

When a server such as a center server or a cloud server performs control of the power usage of an entire group, in each consumer facility in the group, a control device in the facility controls equipment devices in the facility in accordance with a control command or control data acquired by communication from a server outside the facility. In this case, if the control device in the facility fails to receive the control command or the control data from the server due to a communication failure or the like, the power usage of the equipment devices in the facility is difficult to appropriately control.

It is an object of the present disclosure to control (limit) the power usage of a group including a plurality of consumers so as to reduce failures caused by communication between a server serving as a controller and a consumer facility to be controlled.

Solution to Problem

A power control system of the present disclosure is a power control system for performing power control such that a target power set for a group including a plurality of consumers is not exceeded, the system including a control information generation server that generates pieces of control information of equipment devices of the consumers; and a control device that controls power usage of the equipment devices of the consumers in accordance with the generated pieces of control information. The control information generation server includes generation means that sets, for each of predetermined time periods, limit values, each for power usage of one of the consumers included in the group, such that the target power of the group is not exceeded, and generating the pieces of control information, each for an equipment device of one of the consumers, including the limit values; and transmission means that transmits the generated pieces of control information to the control device that controls the equipment devices of the consumers before a start of a time period in which control is performed by the control device. The control device includes reception means that receives the pieces of control information of the equipment devices for each of the time periods, the equipment devices being to be controlled by the control device; storage means that holds the received pieces of control information; and control means that controls, for each of the time periods, the power usage of the equipment devices of the consumers in accordance with pieces of control information for the time period among the pieces of control information held in the storage means.

This configuration can reduce failures caused by communication between a server and a consumer facility to control (limit) the power usage of a group including a plurality of consumers.

The generation means of the control information generation server may generate, for each predetermined unit period, the pieces of control information for a plurality of time periods included in the unit period, the transmission means of the control information generation server may transmit, before the unit period starts, the pieces of control information for each of the time periods in the unit period, and the reception means and the storage means of the control device may receive and hold, before the unit period starts, the pieces of control information for each of the time periods in the unit period.

This configuration allows the control information for the unit period to be transmitted to the control device in advance, making it possible to reduce failures caused by communication between the server and the consumer facility.

Further, the generation means of the control information generation server may set limit values of the plurality of consumers included in the group for a time period such that a sum of differences, for consumers for which limit values are set to be higher for the time period than limit values for a time period immediately preceding the time period, between the limit values for the time period and the limit values for the time period immediately preceding the time period is not larger than a sum of differences, for consumers for which limit values are set to be lower for the time period than limit values for the time period immediately preceding the time period, between the limit values for the time period and the limit values for the time period immediately preceding the time period.

This configuration can prevent a total value of the limit values of the consumers included in the group from exceeding the target power of the group.

Further, the transmission means of the control information generation server may transmit pieces of control information for respective equipment devices of the plurality of consumers included in the group regarding a time period to the control device that controls the equipment devices to be controlled by using the pieces of control information, such that pieces of control information for decreasing limit values for the time period from limit values for a time period immediately preceding the time period are transmitted earlier than pieces of control information for increasing limit values for the time period from limit values for the time period immediately preceding the time period.

This configuration can prevent a total value of the limit values of the consumers included in the group from exceeding the target power of the group even if a communication failure occurs during communication of control information between the server and the consumer facility.

Further, the transmission means of the control information generation server may transmit the pieces of control information for decreasing the limit values for the time period from the limit values for the time period immediately preceding the time period, in descending order of an amount of decrease, and transmit the pieces of control information for increasing the limit values for the time period from the limit values for the time period immediately preceding the time period, in ascending order of an amount of increase.

This configuration can prevent a total value of the limit values of the consumers included in the group from exceeding the target power of the group even if a communication failure occurs during communication of control information sequentially transmitted for each consumer between the server and the consumer facility.

Further, the transmission means of the control information generation server may transmit pieces of control information for respective equipment devices of the plurality of consumers included in the group regarding a time period to the control device that controls the equipment devices to be controlled by using the pieces of control information, such that the pieces of control information are sequentially transmitted for each of the consumers included in the group in an order in which, at a time point at which transmission of a piece of control information of a consumer among the consumers included in the group is completed, a total of limit values in all pieces of control information that have been transmitted so far is not larger than a total of limit values of corresponding consumers for a time period immediately preceding the time period.

This configuration can prevent a total value of the limit values of the consumers included in the group from exceeding the target power of the group even if a communication failure occurs during communication of control information sequentially transmitted for each consumer between the server and the consumer facility at the time point at which the transmission of control information for some of the consumers included in the group is completed.

Further, when pieces of control information for a time period are not received before the time period starts, the control means of the control device may control the equipment devices such that limit values in pieces of control information for a time period preceding the time period are not exceeded, the pieces of control information for the time period preceding the time period being held in the storage means.

This configuration can control the equipment devices so as to prevent a total value of the limit values of the consumers included in the group from exceeding the target power of the group even if a communication failure occurs during communication of control information between the server and the consumer facility.

A power control device of the present disclosure is a power control device included in a system for performing power control such that a target power set for a group including a plurality of consumers is not exceeded, the power control device controlling power usage of an equipment device of a consumer in the group. The power control device includes reception means that receives control information for an equipment device of each of the consumers included in the group for each of predetermined time periods, the control information including a limit value of power usage of the consumer, the limit value being set such that the target power of the group is not exceeded; storage means that stores the control information received by the reception means; and control means that controls, for each of the time periods, the power usage of the equipment device of the consumer in accordance with control information for the time period within control information stored in the storage means.

This configuration can control the equipment device to control (limit) the power usage of a group including a plurality of consumers even if a communication failure occurs during communication of control information between a server and a consumer facility.

When control information for a time period is not received before the time period starts, the control means may control the equipment device such that a limit value in control information for a time period preceding the time period is not exceeded, the control information for the time period preceding the time period being held in the storage means.

This configuration can control the equipment devices so as to prevent a total value of the limit values of the consumers included in the group from exceeding the target power of the group even if a communication failure occurs during communication of control information between the server and the consumer facility.

A program of the present disclosure is a program for causing a computer for controlling a power control device included in a system for performing power control such that a target power set for a group including a plurality of consumers is not exceeded, the power control device controlling power usage of an equipment device of a consumer in the group, to function as reception means that receives control information for an equipment device of each of the consumers included in the group for each of predetermined time periods, the control information including a limit value of power usage of the consumer, the limit value being set such that the target power of the group is not exceeded; and control means that controls, for each of the time periods, the power usage of the equipment device of the consumer in accordance with control information for the time period within control information stored in storage means that stores the control information received by the reception means.

A computer having installed therein the program can reduce failures caused by communication between a server and a consumer facility to control (limit) the power usage of a group including a plurality of consumers.

BRIEF DESCRIPTION OF DRAWINGS

FIGS. 6A to 6C include diagrams illustrating an example of predicted power usage of one consumer, in which FIG. 6A is a diagram illustrating an example of actual results of power usage in the past, FIG. 6B is a diagram illustrating prediction results of power usage over a day, and FIG. 6C is a diagram illustrating an example of predicted values for respective time periods in the prediction results.

FIGS. 7A to 7C include diagrams illustrating an example of adding up predicted power usage of a group including a plurality of consumers, in which FIG. 7A is a diagram illustrating example predictions for the respective consumers included in the group, FIG. 7B is a diagram illustrating prediction results of the entire group, and FIG. 7C is a diagram illustrating an example of predicted values for respective time periods in the prediction results of the group.

FIGS. 8A to 8C include diagrams illustrating an example of limit values set for respective consumers included in a group, in which FIG. 8A is a diagram illustrating an example of prediction of average power used by the group per time period, FIG. 8B is a diagram illustrating a result of allocation of limit values to the consumers included in the group, and FIG. 8C is a diagram illustrating an example of limit values allocated to one of the consumers included in the group for the respective time periods.

DESCRIPTION OF EMBODIMENTS

An embodiment will be described in detail hereinafter with reference to the accompanying drawings.

<System Configuration>

Figure 1:
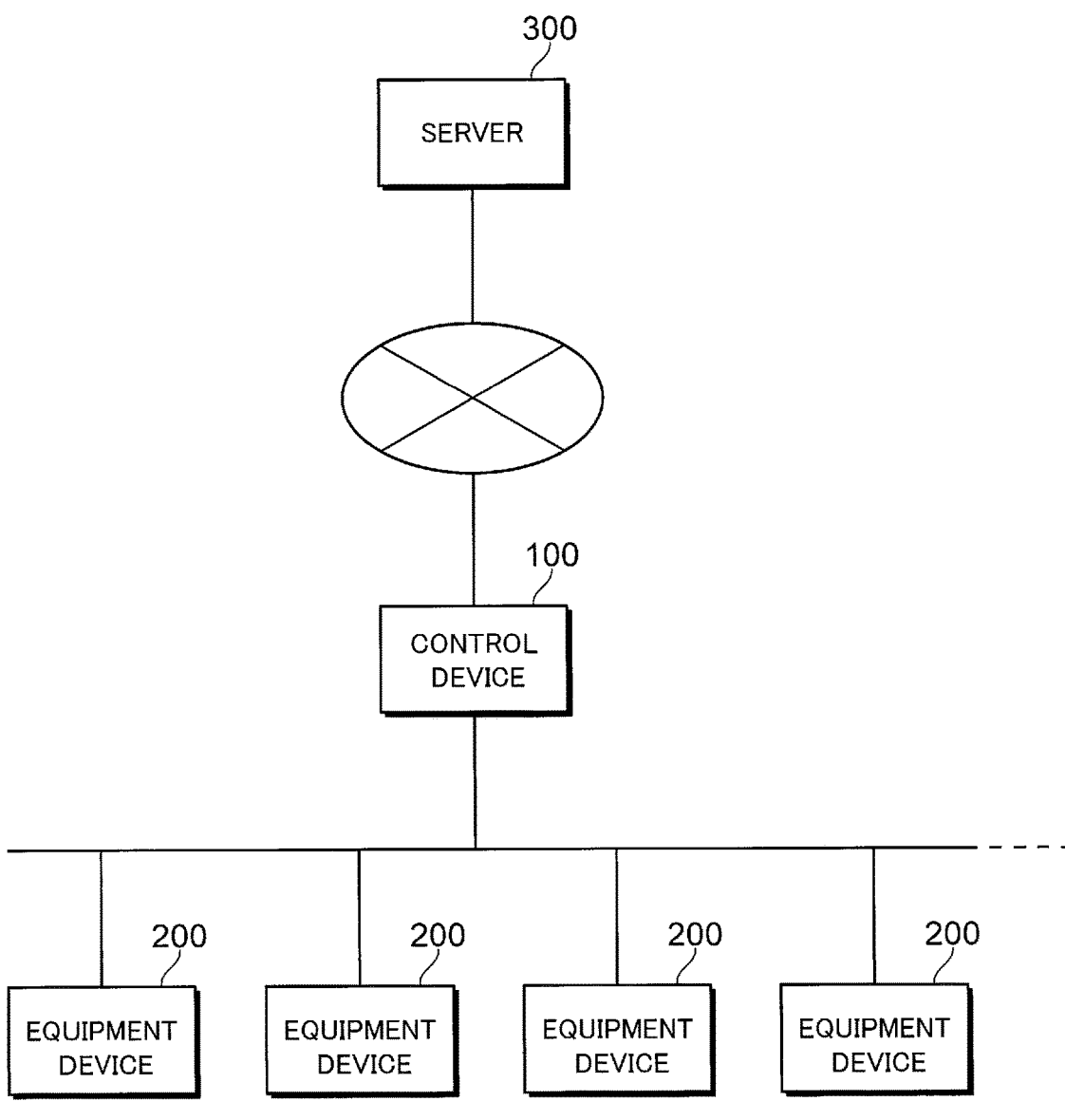
FIG. 1 is a diagram illustrating an overall configuration of a control system for equipment devices to which the present embodiment is applied.

FIG. 1 is a diagram illustrating an overall configuration of a control system for equipment devices to which the present embodiment is applied. The control system according to the present embodiment includes a control device 100, an equipment device 200 that is a device to be controlled, and a server 300. The control device 100 and the equipment device 200 are connected to each other via a network. The network may be a LAN (Local Area Network) using a dedicated line, a WAN (Wide Area Network), a VPN (Virtual Private Network) set on the Internet, or the like.

The equipment device 200 is a piece of equipment or a device that operates using power. The control device 100 controls the operation of one or more equipment devices 200. FIG. 1 illustrates an example configuration in which the control device 100 controls a plurality of equipment devices 200. The equipment devices 200 may be of any type as long as the equipment devices 200 are pieces of equipment or devices that operate using power and whose operation is controlled by the control device 100. The following description may describe an example in which the control system of the present embodiment is applied to control of an air conditioner as a specific example of the equipment devices 200.

Each of the equipment devices 200 includes a control means that controls the equipment device 200 in accordance with an instruction from the control device 100. The control device 100 generates an instruction (hereinafter referred to as a "control instruction") for controlling the equipment devices 200 to be controlled, and transmits the generated control instruction to each of the equipment devices 200. The control device 100 is an example of a power control device. In each equipment device 200, the control instruction is acquired from the control device 100, and the control means of the equipment device 200 performs setting of the equipment device 200 in accordance with the acquired control instruction and controls the operation.

The server 300 provides the control device 100 with control information for controlling the equipment devices 200. The server 300 is an example of a control information generation server. The control device 100 and the server 300 are connected to each other via a network. In the example configuration illustrated in FIG. 1, one control device 100 connected to the server 300 is illustrated. In actuality, a plurality of control devices 100 are connected to the server 300. Each control device 100 is connected to one or more equipment devices 200. The control device 100 and the server 300 are connected to each other via a network, examples of which include the Internet. A LAN or a WAN may be used instead.

<Relationship Between Electricity Charges and Control of Equipment Devices 200>

Electricity charges will now be described. Electricity charges mainly include a base charge and a volume charge, and are specified on a monthly basis. Calculation of the base charge is based on the base charge unit price and the contract power. The contract power is set as the largest value of the maximum power demand over the past one year from the current month. The maximum power demand is the maximum value of monthly average power used per time period (demand time period: 30 minutes). The average power used is an average value of power demand (power usage) over each time period. Calculation of the volume charge is based on the volume charge unit price and the amount of power used per month.

As described above, the contract power is the largest value of the maximum power demand over the past one year. Accordingly, when the maximum power demand over a certain month (in other words, the average power used over a certain time period in the month) is the contract power, the base charge based on the contract power is charged over one year even if the maximum power demand is kept lower than the contract power after the month. When the average power used over a certain time period exceeds the value of the contract power so far and becomes equal to the maximum power demand for the month including the time period, the average power used (maximum power demand) over the time period is used as new contract power for the calculation of the base charge thereafter.

The volume charge unit price is set in various ways. The volume charge unit price may be set to vary under a predetermined condition. For example, the volume charge unit price may be set to vary by time of day, by weekday or weekend, by season, or the like. Due to the trading of electric power in the market, the volume charge unit price may be set to vary to reflect the trading price of electric power in the market.

The equipment devices 200 may be controlled for a reduction in electricity charges required for the operation of the equipment devices 200. In this case, it is demanded to control the equipment devices 200 so that the average power used does not exceed the current contract power. In a case where the volume charge unit price varies, it is more efficient to reduce the amount of power used in a high-unit-price time period than to reduce the amount of power used in a low-unit-price time period, in terms of reduction in electricity charges. However, the volume charge unit price affects only the volume charge per time period, whereas the contract power affects the electricity charges for one year after the current month. Accordingly, control that takes into account average power used is given priority over control that takes into account fluctuations in volume charge unit price.

Electricity charges are charged to the subscribers supplied with electricity. In the present embodiment, the subscribers supplied with electricity are assumed to be a group including a plurality of consumers. Accordingly, the average power used is obtained as a total value of average power used by the plurality of consumers included in the group over each time period. The base charge is determined based on the maximum power demand (maximum value of monthly average power used per time period) per group.

The maximum power demand per group is usually less than the total sum of the maximum power demands of the consumers included in the group. This is because the time period in which the maximum power demand is obtained is generally different among the consumers included in the group. Thus, the base charge set for the group is lower than the total sum of the base charges set for the consumers included in the group in accordance with the respective maximum power demands.

Each group is assigned one or more control devices 100. The one or more control devices 100 perform control on the equipment devices 200 of the consumers included in the group in consideration of the average power used per predetermined unit time and the volume charge unit price in accordance with the electricity charges (the base charge and the volume charge) set per group.

Each consumer possesses one or more equipment devices 200, and the control device 100 controls the equipment devices 200 of one or more consumers. A place where one or more equipment devices 200 are installed is referred to as a facility. However, one consumer does not always correspond to one control device 100, and one consumer does not always correspond to one facility. A plurality of equipment devices 200 possessed by one consumer may be controlled by a plurality of control devices 100, or equipment devices 200 possessed by a plurality of consumers may be controlled by one control device 100. Likewise, a plurality of equipment devices 200 possessed by one consumer may be installed in a plurality of facilities, or equipment devices 200 possessed by a plurality of consumers may be installed in one facility. Further, equipment devices 200 installed in one facility may be controlled by a plurality of control devices 100, or equipment devices 200 installed in a plurality of facilities may be controlled by one control device 100. One control device 100 may be assigned to a plurality of groups. In the following description, for simplicity, it is assumed that equipment devices 200 of one consumer are installed in one facility and one consumer is assigned one control device 100. Accordingly, it is assumed that one control device 100 corresponds to one facility, an equipment device 200 of each consumer that are installed in each facility are controlled by the control device 100 provided for the facility and corresponding to the consumer.

<Configuration of Server 300>

Figure 2:
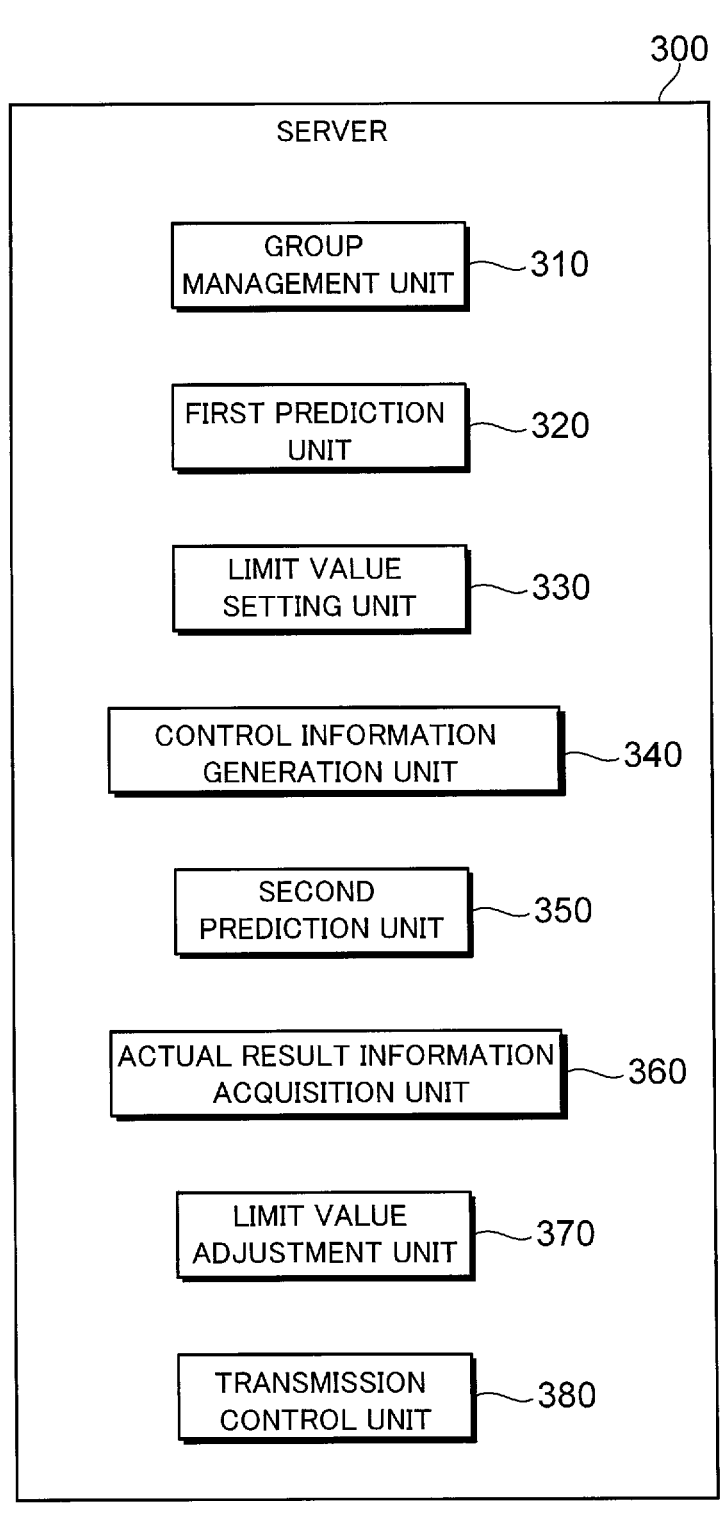
FIG. 2 is a diagram illustrating a configuration of a server.

FIG. 2 is a diagram illustrating a configuration of the server 300. The server 300 is implemented as, for example, a server (so-called cloud server) constructed on a cloud environment of a network. The server 300 includes a group management unit 310, a first prediction unit 320, a limit value setting unit 330, a control information generation unit 340, a second prediction unit 350, an actual result information acquisition unit 360, a limit value adjustment unit 370, and a transmission control unit 380.

The group management unit 310 manages the group of consumers described above. As described above, the group is set as a unit of power contract. The group management unit 310 acquires and holds information on the contract power, the maximum power demand, and the average power used per time period of the group. The group management unit 310 further manages the consumers included in the group. The group management unit 310 acquires and holds information on the contract power, the maximum power demand, and the average power used per time period of each of the consumers included in the group. The information on the average power used by each consumer is obtained from, for example, the control device 100 that controls the equipment devices 200 of the consumer. The information on the average power used by the group is obtained from, for example, the control device 100 that controls the equipment devices 200 of the consumers included in the group (hereinafter referred to as "equipment devices 200 of the group"). Specifically, for example, total average power used by the consumers included in the group over each time period is set as the average power used by the group.

The first prediction unit 320 predicts, for each of the consumers included in the group, the average power used by the equipment devices 200 of the consumer over each time period. The first prediction unit 320 is an example of a prediction means. The average power used over each time period is predicted by the first prediction unit 320, based on, for example, history information regarding the operation of an equipment device 200 of each consumer in the group in the past. The history information regarding the operation includes a wide variety of information related to the operation of the equipment devices 200, such as information on the operating environment of the equipment devices 200, as well as information on the operating state of the equipment devices 200. The information on the operating state of the equipment devices 200 includes, for example, information such as the operating rate, the continuous operating time, and the number of times of operation. The information on the operating environment includes, for example, weather conditions such as weather, temperature, and humidity, and information such as a month, a day, and a time of day.

The average power used over a specific time period of a specific date (hereinafter referred to as "specific time period") may be predicted based on the average power used by the equipment device 200 over a reference time period relative to the specific time period. The reference time period is set based on, for example, history information regarding operation. The reference time period may be, for example, a past time period in which weather conditions are similar to weather conditions expected at the date and time to which the specific time period corresponds, or a corresponding time period of the same day of the same month a year ago. Alternatively, the average power used by the equipment device 200 over the specific time period may be predicted in consideration of the average power used by the equipment device 200 over time periods before and after the reference time period, the transition of the average power used by the equipment device 200 over time periods of several days until the day including the reference time period, or the like.

The limit value setting unit 330 sets, for each of the consumers included in the group, a limit value for the average power used by the equipment devices 200 of the consumer over each time period, based on the result predicted by the first prediction unit 320. The limit value setting unit 330 is an example of a setting means. If the average power used by the group exceeds the contract power of the group, the average power used is set as new contract power, resulting in an increase in the base charge of the electricity charges. Accordingly, it is demanded to set, for the group, target power based on the contract power and to perform control such that the average power used by the entire equipment devices 200 of the group over each time period does not exceed the target power. Further, the limit value for each time period is set for each consumer such that the total value of the limit values of the consumers is equal to or less than a threshold based on the target power. The target power is set to a value equal to or less than the contract power, for example, to a value lower than the contract power by a certain value. The threshold is set to a value equal to or less than the target power, for example, a value lower than the target power by a certain value.

The limit value of each of the consumers included in the group is set based on, for example, prediction of the average power used by the consumer, which is performed by the first prediction unit 320. From the prediction by the first prediction unit 320, the predicted proportion of the average power used by each consumer in the group is identified for each time period. For example, in a case where the total value of the limit values of the consumers is set to be equal to the threshold based on the target power described above, the average power used corresponding to the threshold is divided according to the proportions of the average power used by the respective consumers, which are predicted by the first prediction unit 320, to determine the limit values of the respective consumers. In other words, the limit value means the power usage available to each consumer for the time period.

Alternatively, the limit value may be set based on the actual value of the average power used per consumer per time period in a past specific period, instead of based on the proportion of the average power used per consumer predicted for each time period. For example, the proportion of the actual value of the average power used by each consumer over the reference time period described in the description of the prediction by the first prediction unit 320 to the specific time period described in the same description is identified. The proportion of the actual value may be used to set the limit value of each consumer for the specific time period. The specific period is determined in accordance with the amount of information obtained as the actual value of the reference time period. The specific period may be set as, for example, the past one year or several years, or a period from a specific month and day to a specific month and day.

Alternatively, the limit value may be set based on the maximum value of the average power used per consumer per time period in the specific period. For example, it is assumed that the specific period is set as the past one year. The maximum value of the average power used per time period in the past one year can be obtained for each consumer. Then, the maximum values of the respective consumers may be compared with each other, and the limit values of the respective consumers may be set in proportions according to the ratio. In this case, unlike the use of the actual value of the reference time period, the time period in which the average power used is the maximum value may be different for each consumer.

In a case where, for example, the total value of the limit values of the respective consumers for each time period is set to be equal to the threshold based on the target power described above, the limit value setting unit 330 may set the limit value of each consumer as follows. The limit value for a certain time period, which is set for each consumer, may be set to a higher value or a lower value than the limit value for the immediately preceding time period, depending on the consumer. Accordingly, the sum of the differences, for all the consumers for which the limit values are set to be higher than the limit values for the immediately preceding time period, between the limit values for the immediately preceding time period and the set limit values is compared with the sum of the differences, for all the consumers for which the limit values are set to be lower than the limit values for the immediately preceding time period, between the limit values for the immediately preceding time period and the set limit values. Then, the limit values of the consumers are set such that the former is not larger than the latter.

Further, a lower limit may be set as a limit value. The lower limit is a value greater than 0. Accordingly, in the prediction by the first prediction unit 320, even when the average power used by a certain consumer over a certain time period is predicted to be 0, the limit value corresponding to the lower limit is set. Such a limit value is set to avoid inconvenience that, in a case where the limit value is set to 0 for a time period in which the average power used by a certain consumer is predicted to be 0, the limit value is exceeded immediately when the consumer uses the equipment device 200 in the time period. The average power used may be predicted to be 0 when, for example, the average power used by the consumer over the reference time period, which is used for the prediction by the first prediction unit 320, is 0.

The method for setting the lower limit may be appropriately determined in accordance with, for example, the operation or specification of the control system, or agreement within the group, between the consumers, or the like. For example, a fixed value may be determined in advance. Alternatively, a value that varies based on a predicted value or the like of the average power used by the entire group over each time period may be used. When a fixed value is to be set as the lower limit, the same value may be set for the consumers, or a different value may be set for each consumer according to an appropriate condition or a request from the consumer. The predicted value of the average power used by the entire group per time period is obtained by adding up the predicted values of the average power used by the consumers included in the group per time period, which are obtained by the first prediction unit 320.

When a lower limit is to be set as a limit value, a lower-limit threshold may be set for the limit value, and the lower limit may be applied as the limit value when the limit value assigned to a certain consumer falls below the lower-limit threshold. A value different from the lower limit may be set as the lower-limit threshold. For example, a value lower than the lower limit is set as the lower-limit threshold. When the limit value assigned to a certain consumer falls below the lower-limit threshold in a certain time period, the lower limit, which is higher than the lower-limit threshold, is set as the limit value of the consumer for the time period.

When the lower limit described above is set as a limit value, a limit value different from (larger than) the value based on the proportion specified by the limit value setting method described above is assigned to some of the consumers included in the group. Accordingly, if the value given as the lower limit is simply added to the value calculated by the proportion according to the setting method described above to set the limit value of each consumer, the total value of the limit values of the respective consumers may exceed the threshold based on the target power described above. It is therefore desirable to perform correction such that, if there is a consumer for which the lower limit is applied to the limit value, the total value of the limit values of the respective consumers that take into account the lower limit does not exceed the threshold. It is conceivable to set the limit value of each consumer such that, for example, a value obtained by adding together the value calculated by the proportion according to the setting method described above and the applied lower limit is equal to or less than the threshold described above. It is also conceivable to subtract the total of the applied lower limits from the limit value of the consumer to which the lower limit is not applied.

A description has been made that a limit value is set for the average power used by an equipment device 200 of each consumer over each time period. Alternatively, a configuration may be used in which a limit value is set only for the average power used over a time period satisfying a specific condition. For example, the predicted values of the average power used by the consumers included in the group over a certain time period, which are obtained by the first prediction unit 320, are added up to obtain the predicted value of the average power used by the entire group for the certain time period. A limit value may be set only for the average power used over such a time period on condition that the predicted value of the average power used by the group exceeds the threshold.

In contrast, consideration will be given to a case where the predicted value of the average power used by the group falls below the threshold described above. The threshold is set based on the target power, and the target power is set based on the contract power. For this reason, if many consumers in the group do not use large power during a certain time period (e.g., a time period from midnight to dawn), the predicted value of the average power used by the group during the time period is considered to fall significantly below the threshold. In this case, the limit value of each of the consumers included in the group may be set to a value higher than the predicted value of the average power used by the consumer within a range in which the total value of the limit values of the respective consumers does not exceed the threshold.

The control information generation unit 340 generates control information for controlling an equipment device 200 of each of the consumers included in the group. The control information is information for causing the control device 100 to control the equipment devices 200 so that the average power used by the equipment devices 200 of the consumer over each time period does not exceed the limit value of the consumer for the time period, which is set by the limit value setting unit 330. Accordingly, the control information includes information on the limit value set by the limit value setting unit 330 for each consumer. The limit value setting unit 330 and the control information generation unit 340 are examples of a generation means. Before the start of each time period in which control is performed using control information, the control information generation unit 340 generates control information for the time period. Alternatively, the control information generation unit 340 may generate control information for a plurality of time periods included in each predetermined unit period. Specifically, for example, the control information generation unit 340 may be configured to collectively generate control information for 48 time periods on a daily basis until the previous day.

When the limit value of each consumer, which is set by the limit value setting unit 330, is adjusted by the limit value adjustment unit 370, the control information generation unit 340 generates control information for reflecting the adjustment result of the limit value in the control of the equipment devices 200. When the control information based on the limit value set by the limit value setting unit 330 and the control information based on the limit value adjusted by the limit value adjustment unit 370 are hereinafter referred to as "general control information" and "individual control information", respectively, if they are distinguished from each other. As will be described in detail below, the limit value adjustment unit 370 adjusts the limit value within a time period during which control for reflecting the adjustment of the limit value is performed. Accordingly, unlike the general control information, the individual control information is generated within a time period during which control is performed using the individual control information, after the time period starts.

In a time period during which the equipment devices 200 are currently being controlled (hereinafter referred to as a "current time period"), the second prediction unit 350 predicts the average power used by the equipment devices 200 over the current time period. The average power used is predicted by the second prediction unit 350, based on, for example, information related to the operating status of an equipment device 200 of each consumer within the current time period. The information related to the operating status includes, for example, information such as the transition of the power usage of the equipment device 200 from the start of the current time period to the time point of prediction within the time period, the amount of power used, the state of operation, and the settings related to the operation. The settings related to the operation are specifically selected in accordance with the type of the equipment device 200. For example, when the equipment device 200 is an air conditioner, information such as a difference between a set temperature and an actual room temperature can be used.

The actual result information acquisition unit 360 acquires actual result information related to the operating status of an equipment device 200 of each of the consumers included in the group. Examples of the acquired actual result information include the above-described actual result information for the current time period (actual result information from the start of the current time period to the time point at which the actual result information is acquired), and actual result information for a time period that has already ended. The actual result information may be acquired from the control device 100 that controls the equipment device 200 or may be acquired from the equipment device 200 itself. The actual result information for the current time period, which is acquired by the actual result information acquisition unit 360, is used by the second prediction unit 350 for the prediction of the average power used by the equipment device 200.

The limit value adjustment unit 370 adjusts the limit values of the consumers included in the group, which are set by the limit value setting unit 330, based on a predetermined condition. As an example, the limit value adjustment unit 370 adjusts the limit value of each consumer based on the prediction by the second prediction unit 350. As another example, the limit value adjustment unit 370 adjusts the limit value of each consumer based on the actual result information related to the operating status of the equipment device 200 during the current time period, which is acquired by the actual result information acquisition unit 360. The limit values are adjusted such that the consumers included in the group interchange the power available to the consumers for use. For example, the limit values of some consumers among the consumers included in the group are decreased, and the limit values of the other consumers are increased by an amount corresponding to the decrease in the limit values of some consumers.

The transmission control unit 380 transmits the control information generated by the control information generation unit 340 to the control device 100 that controls the equipment device 200 of the consumer corresponding to the control information. The transmission control unit 380 is an example of a transmission means. Before the start of each time period in which control is performed using control information, the transmission control unit 380 transmits general control information for the time period to the control device 100. For example, the transmission control unit 380 may transmit general control information for one time period until the end of the time period immediately preceding the time period, or may transmit general control information for a plurality of consecutive time periods until the start of the first time period among the plurality of time periods. Alternatively, the transmission control unit 380 may transmit general control information for each predetermined unit period to the control device 100 before the start of the unit period. Specifically, for example, the transmission control unit 380 may transmit general control information for 48 time periods on a daily basis until the previous day.

Alternatively, the transmission control unit 380 may transmit general control information for each time period to the control device 100 such that general control information for decreasing the power usage over the time period from the power usage over the immediately preceding time period is transmitted earlier than general control information for increasing the power usage over the time period from the power usage over the immediately preceding time period.

Further, immediately after individual control information is generated, the transmission control unit 380 transmits the individual control information to the control device 100 that controls the equipment device 200 to be controlled using the generated individual control information. The transmission control unit 380 may transmit individual control information to the control device 100 such that individual control information of the equipment device 200 whose limit value is decreased by adjustment is transmitted earlier than individual control information of the equipment device 200 whose limit value is increased by adjustment.

<Configuration of Control Device 100>

Figure 3:
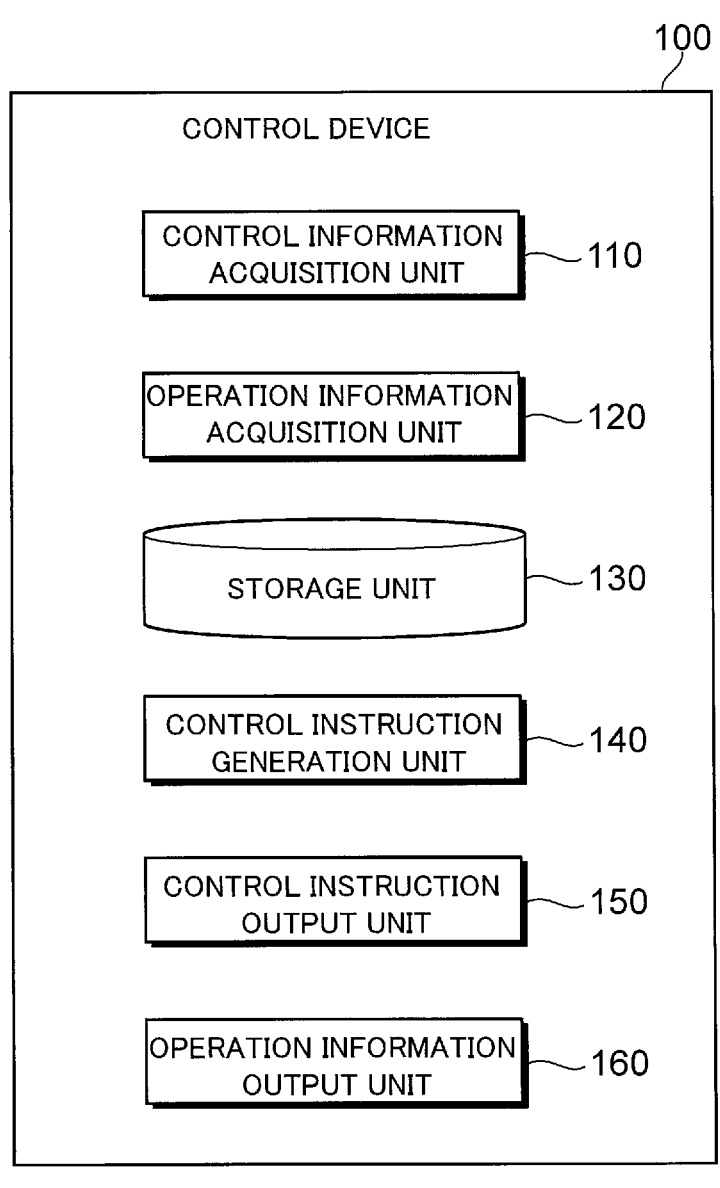
FIG. 3 is a diagram illustrating a configuration of a control device.

FIG. 3 is a diagram illustrating a configuration of the control device 100. The control device 100 is implemented as an information processing device connected to the server 300 and the equipment device 200 via a network. The control device 100 may be a device (e.g., an edge server) located close to the equipment device 200 to be controlled, or may be a server (cloud server) constructed on a cloud environment. The control device 100 includes a control information acquisition unit 110, an operation information acquisition unit 120, a storage unit 130, a control instruction generation unit 140, a control instruction output unit 150, and an operation information output unit 160.

The control information acquisition unit 110 receives and acquires control information of the equipment device 200 from the server 300 via a network interface of the control device 100. The control information acquisition unit 110 is an example of a reception means. The control information acquired by the control information acquisition unit 110 includes, as control information for a certain time period, general control information acquired before the start of the time period and individual control information acquired during the time period. The general control information includes information on a limit value of average power used that is set for each consumer. The individual control information includes information on a new limit value for adjusting the limit value included in the general control information for the current time period.

The operation information acquisition unit 120 acquires operation information of the equipment device 200 to be controlled by the control device 100. The operation information acquired by the operation information acquisition unit 120 includes a wide variety of information related to the operation of the equipment device 200. The operation information includes, for example, information indicating an operation state such as an operating rate or a continuous operating time of the equipment device 200. The operation information may include various kinds of information considered to affect the operation of the equipment device 200, such as a time of day in which the equipment device 200 is operated, and operation on weekdays or weekends. The operation information acquisition unit 120 may further acquire information on an environment in which the equipment device 200 is installed, such as temperature and humidity. These pieces of information can be acquired by various existing methods in accordance with the type of information. For example, the information may be acquired from the equipment device 200 itself or from various sensor devices or the like. Information on a date and time is obtained by, for example, a clock function or a calendar function of the control device 100.

The storage unit 130 stores various kinds of information acquired by the control information acquisition unit 110 and the operation information acquisition unit 120. The control information acquired by the control information acquisition unit 110 is used to control the equipment device 200. In the control information, the general control information for each time period is stored in the storage unit 130 before the start of the time period in which control is performed using each piece of general control information. The operation information of the equipment device 200, which is acquired by the operation information acquisition unit 120, is transmitted to the server 300 at a predetermined timing and is used for prediction by the first prediction unit 320 and the second prediction unit 350 of the server 300.

In a case where the server 300 transmits general control information for a time period based on each predetermined unit period before the start of the unit period, the general control information is acquired by the control information acquisition unit 110 and stored in the storage unit 130 before the start of the unit period. For example, in a case where the unit period is a period corresponding to one time period, general control information for one time period is stored in the storage unit 130 before the start of the time period in which control is performed using the general control information. In a case where the unit period is a period corresponding to a plurality of time periods, general control information for the plurality of time periods is stored in the storage unit 130 before the start of the first time period in which control is performed using the general control information. Specifically, for example, in a case where the unit period is one day, general control information for 48 time periods of a day is stored in the storage unit 130 until the previous day.

The control instruction generation unit 140 generates a control instruction for controlling the equipment device 200, based on the control information acquired by the control information acquisition unit 110. The control instruction generation unit 140 generates a control instruction for operating the equipment device 200 so that the average power used by an equipment device 200 of each consumer over each time period does not exceed the limit value set for the consumer for the time period. When a consumer has a plurality of equipment devices 200, a control instruction is generated for each time period so that the total value of average power used by all of the equipment devices 200 of the consumer does not exceed the limit value for the corresponding time period. In this case, the method by which the consumer allocates power to the plurality of equipment devices 200 thereof so that the limit value set for the consumer is not exceeded is not particularly limited. For example, power may be equally allocated according to the types, device scales, or the like of the equipment devices 200. Alternatively, a specific equipment device 200 may be allocated sufficient power, and the remaining power may be allocated to the other equipment devices 200. Alternatively, in a certain time period, some of the equipment devices 200 are not operated, and only other equipment devices 200 may use power. Alternatively, the control instruction generation unit 140 may generate a control instruction in consideration of the operation information of the equipment devices 200 acquired by the operation information acquisition unit 120. In the control information acquired by the control information acquisition unit 110, the control instruction generated by the control instruction generation unit 140 based on the general control information is held in the storage unit 130.

The control instruction output unit 150 reads the control instruction generated by the control instruction generation unit 140 based on the general control information in the control information acquired by the control information acquisition unit 110 from the storage unit 130 during a time period in which control is performed using the general control information, and transmits the control instruction to the equipment device 200 to be controlled. Further, the control instruction output unit 150 immediately transmits the control instruction generated by the control instruction generation unit 140 based on the individual control information in the control information acquired by the control information acquisition unit 110 to the equipment device 200 to be controlled. The control instruction generation unit 140, which generates a control instruction, and the control instruction output unit 150, which transmits the generated control instruction to the equipment device 200, are examples of a control means in the control device 100.

The operation information output unit 160 reads the operation information of the equipment device 200, which is acquired by the operation information acquisition unit 120 and held in the storage unit 130, from the storage unit 130 in accordance with a predetermined condition, and transmits the operation information to the server 300. The operation information may be read and transmitted in response to a request from the server 300 or may be read and transmitted periodically at a predetermined time of a day or the like.

<Hardware Configuration of Control Device 100 and Server 300>

Figure 4:
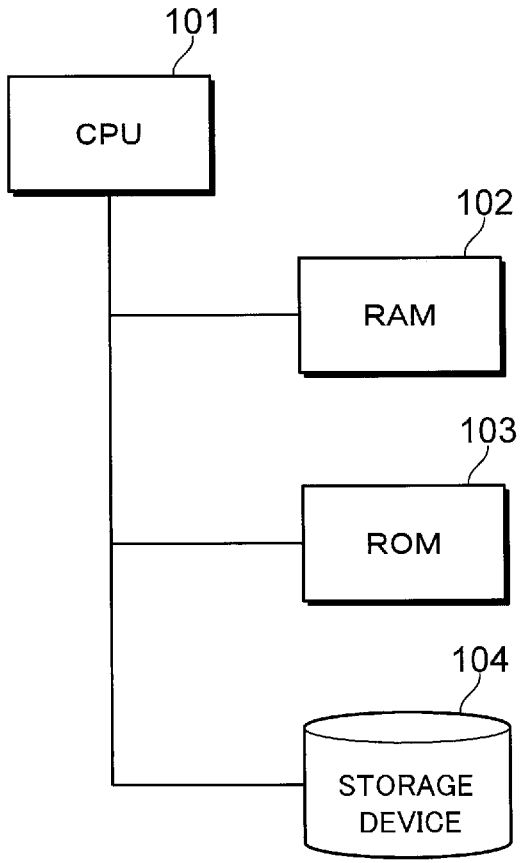
FIG. 4 is a diagram illustrating an example hardware configuration of the control device and the server.

FIG. 4 is a diagram illustrating an example hardware configuration of the control device 100 and the server 300. The control device 100 and the server 300 are implemented by a computer, for example. The control device 100 and the server 300 may be implemented as servers constructed in a cloud environment. Even in this case, the control device 100 and the server 300 are configured as virtual systems using system resources of physical computers, as illustrated in FIG. 4, on a network.

The computer that implements the control device 100 includes an arithmetic unit, namely, a CPU (Central Processing Unit) 101, and storage means, namely, a RAM (Random Access Memory) 102, a ROM (Read Only Memory) 103, and a storage device 104. The RAM 102 is a main storage device (main memory) and is used as a working memory for the CPU 101 to perform arithmetic processing. The ROM 103 holds programs and data such as set values prepared in advance. The CPU 101 can directly read the programs and the data from the ROM 103 to execute processing. The storage device 104 is a means for storing programs and data. The storage device 104 stores a program. The CPU 101 reads the program stored in the storage device 104 into the main storage device and executes the program. The storage device 104 further stores and saves a result of processing by the CPU 101. Examples of the storage device 104 include a magnetic disk device and an SSD (Solid State Drive).

When the control device 100 is implemented by the computer illustrated in FIG. 4, the functions of the control information acquisition unit 110, the operation information acquisition unit 120, the control instruction generation unit 140, the control instruction output unit 150, and the operation information output unit 160 described with reference to FIG. 3 are implemented by, for example, the CPU 101 executing a program. The storage unit 130 is implemented by the RAM 102 or the storage device 104, for example. When the server 300 is implemented by the computer illustrated in FIG. 4, the functions of the group management unit 310, the first prediction unit 320, the limit value setting unit 330, the control information generation unit 340, the second prediction unit 350, the actual result information acquisition unit 360, the limit value adjustment unit 370, and the transmission control unit 380 described with reference to FIG. 2 are implemented by, for example, the CPU 101 executing a program. The example configuration illustrated in FIG. 4 is merely an example in which the control device 100 is implemented by a computer.

<Configuration of Equipment Device 200>

Figure 5:
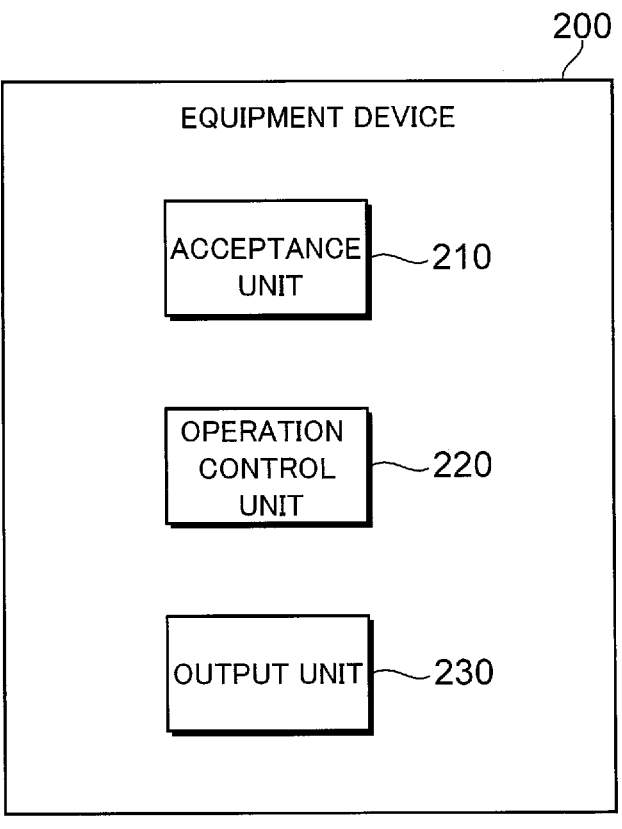
FIG. 5 is a diagram illustrating a configuration of an equipment device.

FIG. 5 is a diagram illustrating a configuration of the equipment device 200. The equipment device 200 includes an acceptance unit 210, an operation control unit 220, and an output unit 230. The equipment device 200 includes a mechanism or a device that operates to implement the functions of the equipment device 200 in accordance with the type. For example, when the equipment device 200 is an air conditioner, the equipment device 200 includes an indoor unit, an outdoor unit, and the like. When the equipment device 200 is a piece of lighting equipment, the equipment device 200 includes a lighting fixture, a control switch, and the like. Such mechanisms and the like have various types and modes that vary depending on the type of the equipment device 200, and the types and modes are not illustrated.

The acceptance unit 210 accepts a control instruction, which is output from the control device 100, via a network by using a network interface (not illustrated).

The operation control unit 220 controls the operation of a mechanism or a device disposed in the equipment device 200 in accordance with the control instruction accepted by the acceptance unit 210. Specifically, for example, when the equipment device 200 is an air conditioner, the acceptance unit 210 accepts information specifying a set temperature as a control instruction, and the operation control unit 220 controls the operation of the indoor unit and the outdoor unit so that the accepted set temperature is achieved. While an example of control related to temperature setting has been given, control based on a control instruction by the operation control unit 220 can be applied to various types of control (e.g., control of humidity or gas components) related to gas that can be controlled by the air conditioner. Also in any equipment device 200 other than the air conditioner, the operation control unit 220 executes control corresponding to the type of the equipment device 200 in accordance with the control instruction accepted from the control device 100.

The output unit 230 outputs information related to the operation state of the equipment device 200 to the control device 100 via a network by using the network interface (not illustrated).

The acceptance unit 210, the operation control unit 220, and the output unit 230 are implemented by a computer, for example. The computer that implements the operation control unit 220 may have the configuration described with reference to FIG. 4. In this case, the respective functions of the acceptance unit 210, the operation control unit 220, and the output unit 230 are implemented by, for example, the CPU 101 illustrated in FIG. 4 executing a program. The respective functions of the acceptance unit 210, the operation control unit 220, and the output unit 230 may be implemented by dedicated hardware. The functions may be implemented by, for example, an ASIC (Application Specific Integrated Circuit), an FPGA (Field-Programmable Gate Array), or any other circuit. A function implemented by the CPU 101 executing a program (software) and a function implemented by dedicated hardware may be combined to implement the acceptance unit 210, the operation control unit 220, and the output unit 230.

<Example of Set Limit Values>

In the present embodiment, a group including a plurality of consumers is a contract target, and contract power is set based on average power used per group per time period. The average power used per group per time period will further be described with reference to the drawings.

FIGS. 6A to 6C include diagrams illustrating an example of predicted power usage of one consumer. FIG. 6A is a diagram illustrating an example of actual results of power usage in the past, FIG. 6B is a diagram illustrating prediction results of power usage over a day, and FIG. 6C is a diagram illustrating an example of predicted values for respective time periods in the prediction results. In the graphs in FIGS. 6A and 6B, the horizontal axis represents time periods (48 time periods) of a day (24 hours), and the vertical axis represents average power (kW) used per time period. The graphs in FIGS. 6A and 6B and the tables in FIG. 6C present the actual results and prediction results of average power used by the equipment devices 200 over the respective time periods of a day. Further, FIGS. 6A to 6C illustrate, for the equipment devices 200 of one consumer, the actual results and the prediction results of the entire equipment devices 200 possessed by the consumer and the actual results and the prediction results of the air conditioner among the equipment devices 200.

FIG. 6A illustrates the actual results of the average power used per time period of three days before (three days before, two days before, and one day before) the day on which the power usage is to be predicted. In the drawings, a graph with a light color indicates the actual results of the entire equipment devices 200, and a graph with a dark color indicates the actual results of the air conditioner. FIG. 6B illustrates an example of prediction results of average power used per time period, which are predicted in consideration of the actual results illustrated in FIG. 6A. Also in FIG. 6B, as in FIG. 6A, a graph with a light color indicates the prediction results of the entire equipment devices 200, and a graph with a dark color indicates the prediction results of the air conditioner. In FIG. 6C, the predicted values of the average power used by the entire equipment devices 200 (in the drawing, illustrated as "building" representing a facility in which the equipment devices 200 are installed) over the respective time periods (the first time period to the 48th time period) of a day and the predicted values of the average power used by the air conditioner among the equipment devices 200 are illustrated in association with each other.

FIGS. 7A to 7C include diagrams illustrating an example of adding up predicted power usage of a group including a plurality of consumers. FIG. 7A is a diagram illustrating example predictions for the respective consumers included in the group, FIG. 7B is a diagram illustrating prediction results of the entire group, and FIG. 7C is a diagram illustrating an example of predicted values for respective time periods in the prediction results of the group. In the graphs in FIGS. 7A and 7B, the horizontal axis represents time periods (48 time periods) of a day (24 hours), and the vertical axis represents average power (kW) used per time period. The graphs in FIGS. 7A and 7B and the tables in FIG. 7C present the prediction results of average power used by the consumers and the group over the respective time periods of a day. The prediction results of average power used by the entire equipment devices 200 of each consumer are referred to as prediction results of average power used by the consumer or prediction results of the consumer.

FIG. 7A illustrates prediction results of average power used per consumer in the group per time period. In FIG. 7A, only the prediction results of three consumers (consumers (1) to (3)) among the plurality of consumers included in the group are illustrated, and the prediction results of the others are omitted. In FIG. 7A, a graph with a light color indicates the prediction results of the entire equipment devices 200, and a graph with a dark color indicates the prediction results of the air conditioner. FIG. 7B illustrates prediction results of average power used by the entire group including the three consumers illustrated in FIG. 7A over the respective time periods. In FIG. 7B, segments (colors) of the graph for each time period indicate that the predicted values of the average power used by the consumers included in the group are added up for the corresponding time period. FIG. 7C illustrates total values of the prediction results of average power used per consumer over the respective time periods (the first time period to the 48th time period) of a day.

It is assumed that the group has a target power (denoted by "target value" in the drawing) of 1000 kW. Referring to FIGS. 7B and 7C, the predicted values of the average power used by the entire group over the 22nd time period to the 31st time period exceed the target power. Accordingly, the limit value for the power usage of each of the consumers included in the group is set such that, during at least these time periods, the predicted values of the average power used by the entire group do not exceed the target power. The limit value itself of each consumer may be set not only for a time period in which the predicted value of the entire group exceeds the target power but also for another time period in which the predicted value of the entire group does not exceed the target power.

Figures 8A, 8B, 8C:
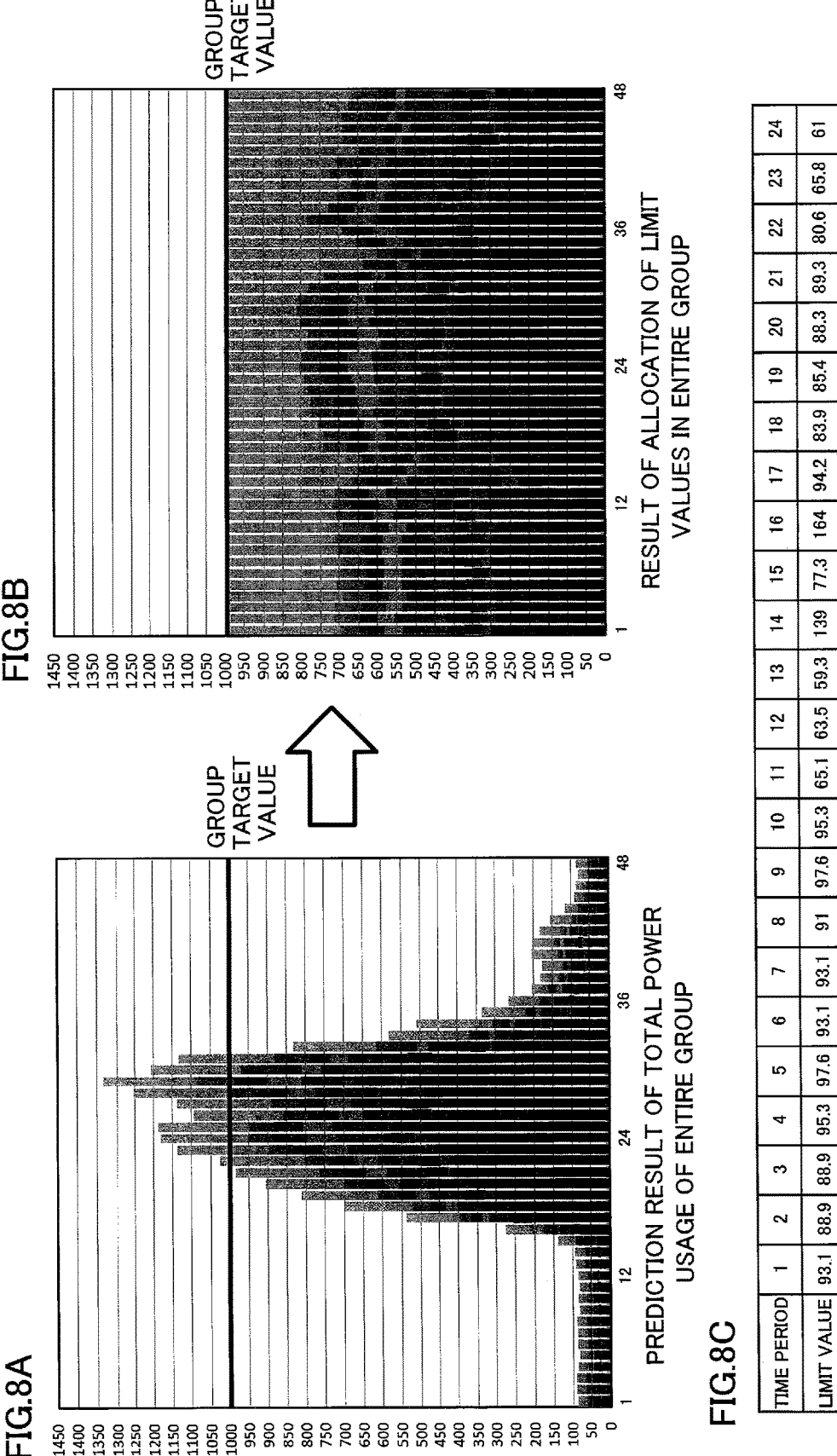

FIGS. 8A to 8C include diagrams illustrating an example of limit values set for respective consumers included in a group. FIG. 8A is a diagram illustrating an example of prediction of average power used by the group per time period, FIG. 8B is a diagram illustrating a result of allocation of limit values to the consumers included in the group, and FIG. 8C is a diagram illustrating an example of limit values allocated to one of the consumers included in the group for the respective time periods. In the graphs in FIGS. 8A and 8B, the horizontal axis represents time periods (48 time periods) of a day (24 hours), and the vertical axis represents average power (kW) used per time period.

FIG. 8A illustrates prediction results of average power used per consumer in the group per time period. The illustrated graph is the same as the graph illustrated in FIG. 7B. FIG. 8B illustrates an example of the result of allocation of limit values set for the consumers included in the group when the average power used by the group for each time period is made equal to the target power. In FIG. 8B, segments (colors) of the graph for each time period indicate the proportions of the limit values allocated to the respective consumers (power usage available to the consumers) for the corresponding time period. In principle, the proportions of the limit values allocated to the respective consumers for each time period are the proportions of the predicted values of the average power used by the respective consumers in the prediction of the average power used by the group illustrated in FIG. 8A. Depending on the predicted value of each consumer, a lower limit, instead of the proportion of the predicted value of the average power used, may be assigned as the limit value. FIG. 8C illustrates the limit values for the respective time periods (the first time period to the 48th time period) of a day, which are allocated to one consumer (consumer (1)) among the consumers included in the group.

<Control Information Transmission Method>

A specific example of a communication method of control information from the server 300 to the control device 100 will be described. In the following description, it is assumed that the total value of the limit values set for the consumers included in the group is set to be the same value as the threshold based on the target power of the group. For simplicity, it is assumed that one control device 100 is associated with one consumer and each control device 100 controls all the equipment devices 200 of the corresponding consumer.

The control information (general control information) including the limit values set by the limit value setting unit 330 of the server 300 is transmitted to the control device 100 before control using the control information is started. Consideration will be given to a case where when control information for a certain time period (hereinafter referred to as a "target time period") is being transmitted from the server 300 to the control device 100, the transmission is interrupted due to a communication failure or the like. In this case, the control device 100 that has acquired already transmitted control information can use the acquired control information (control information for the target time period) to control the equipment devices 200 for the target time period. By contrast, the control device 100 that has not received the control information due to the interruption of the communication fails to control the equipment devices 200 during the target time period, based on the control information for the target time period.

In this situation, examples of the measure for preventing the control device 100, which does not have the control information for the target time period, from stopping the operation of the equipment devices 200 include controlling the equipment devices 200 by using the control information for the time period immediately preceding the target time period (hereinafter referred to as an "immediately preceding time period"). The limit value included in the control information for the target time period may be a value higher or lower than the limit value for the immediately preceding time period, depending on the consumer. However, the total value of the limit values of the consumers should not exceed the threshold based on the target power. Accordingly, even if some control devices 100 take over the control information for the immediately preceding time period due to the interruption of the communication as described above, the total value of the limit values of the consumers for the time period needs to be equal to or less than the threshold described above.

In the present embodiment, accordingly, the server 300 transmits control information having a lower limit value for the target time period than the limit value for the immediately preceding time period earlier than control information having a higher limit value for the target time period than the limit value for the immediately preceding time period. As a result, regardless of the timing at which the transmission of the control information for a target time period is interrupted, the total value of the limit value included in the control information that has been transmitted before the interruption and the limit value included in the control information for the immediately preceding time period, which is used because of the failure of the transmission, is equal to or less than the total value of the limit values of the consumers for the immediately preceding time period. Specific examples will be described hereinafter.

Figure 9:
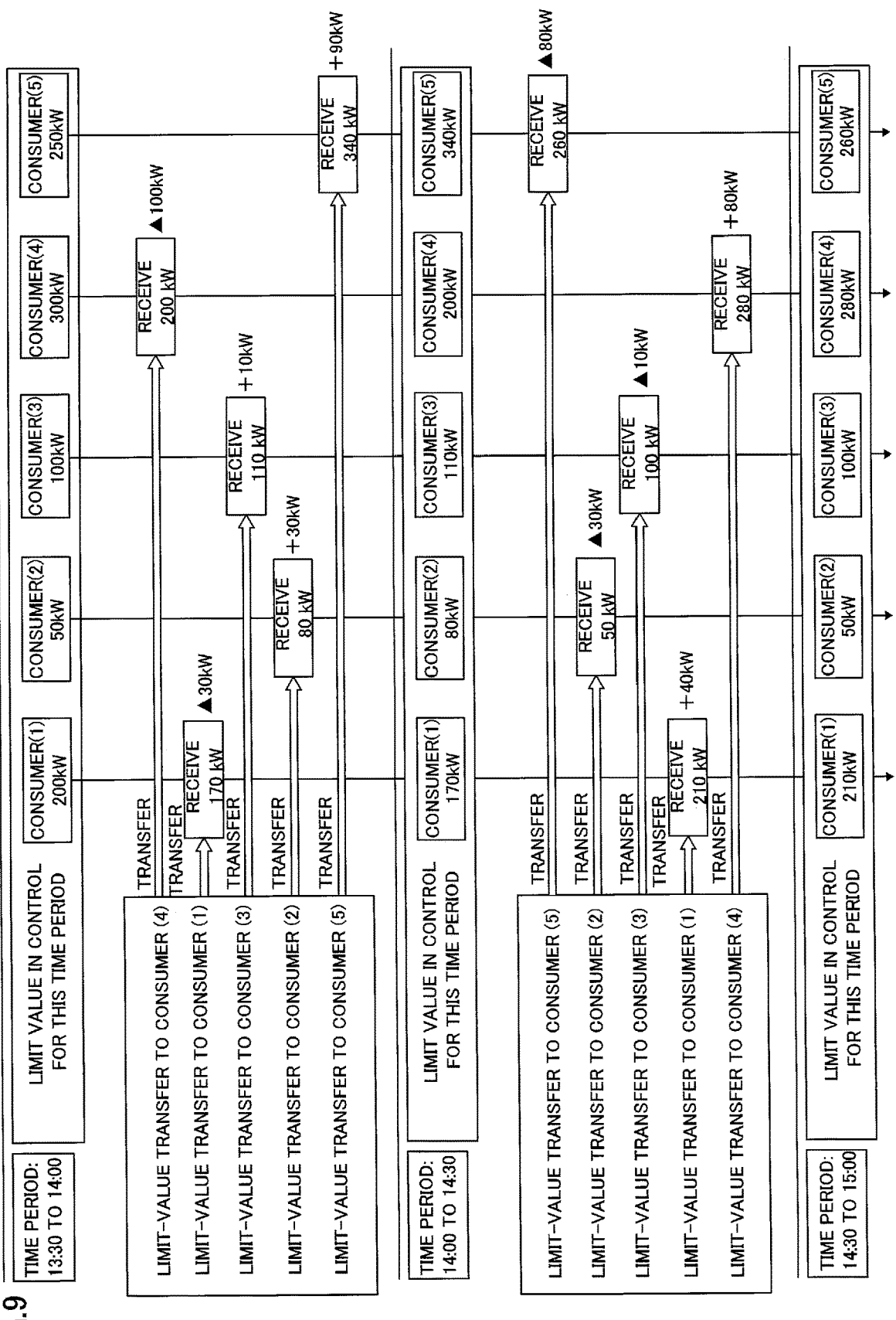
FIG. 9 is a diagram illustrating an example of the order of transmission of control information for each time period.

FIG. 9 is a diagram illustrating an example of the order of transmission of control information for each time period. In the example illustrated in FIG. 9, orders of transmission of control information for two consecutive time periods are illustrated for a group including consumers (1) to (5). First, in a first time period (time period of 13:30 to 14:00), control information for a second time period (time period of 14:00 to 14:30) subsequent to the first time period is transmitted. Then, in the second time period, control information for a third time period (time period of 14:30 to 15:00) subsequent to the second time period is transmitted. In FIG. 9, the order of transmission of control information for each consumer is indicated by an arrow directed from top to bottom (in FIG. 9, represented as "limit-value transfer").

As the limit values of the consumers for the first time period, 200 kW is allocated to the consumer (1), 50 kW is allocated to the consumer (2), 100 kW is allocated to the consumer (3), 300 kW is allocated to the consumer (4), and 250 kW is allocated to the consumer (5). Control information for the second time period is transmitted to the consumers (the control devices 100 corresponding to the consumers). The control information indicates that the limit values allocated to the consumers are 170 kW for the consumer (1), 80 kW for the consumer (2), 110 kW for the consumer (3), 200 kW for the consumer (4), and 340 kW for the consumer (5). As a result of comparison between the limit values allocated to the respective consumers for the first time period and the limit values allocated to the respective consumers for the second time period, the limit value for the consumer (1) is decreased by 30 kW, the limit value for the consumer (2) is increased by 30 kW, the limit value for the consumer (3) is increased by 10 kW, the limit value for the consumer (4) is decreased by 100 kW, and the limit value for the consumer (5) is increased by 90 kW. Accordingly, the server 300 first transmits the control information of the consumer (1) and the consumer (4) whose limit values are decreased, and then transmits the control information of the consumer (2), the consumer (3), and the consumer (5) whose limit values are increased.

More specifically, the order of transmission of the control information may be defined such that the control information of the consumers whose limit values are decreased is transmitted in descending order of the amount of decrease and the control information of the consumers whose limit values are increased is transmitted in ascending order of the amount of increase. In the example of transmission of the control information for the second time period illustrated in FIG. 9, the control information of the consumer (1) and the consumer (4) whose limit values are decreased is transmitted in descending order of the amount of decrease, that is, in the order of the consumer (4) and the consumer (1). The control information of the consumer (2), the consumer (3), and the consumer (5) whose limit values are increased is transmitted in ascending order of the amount of increase, that is, in the order of the consumer (3), the consumer (2), and the consumer (5).

As described above, before the second time period starts, the control information of the consumers for the second time period is transmitted to the control devices 100 corresponding to the respective consumers. After the second time period starts, the control devices 100 control the equipment devices 200 in accordance with the acquired control information. Subsequently, in the second time period, the control information for the third time period is transmitted to the consumers. The control information indicates that the limit values allocated to the consumers are 210 kW for the consumer (1), 50 kW for the consumer (2), 100 kW for the consumer (3), 280 kW for the consumer (4), and 260 kW for the consumer (5). Accordingly, upon determination of the order of transmission of the control information based on the amounts of decrease and the amounts of increase in the limit values in the way described above, the server 300 transmits the control information in the order of the consumer (5), the consumer (2), the consumer (3), the consumer (1), and the consumer (4).

Figure 10:
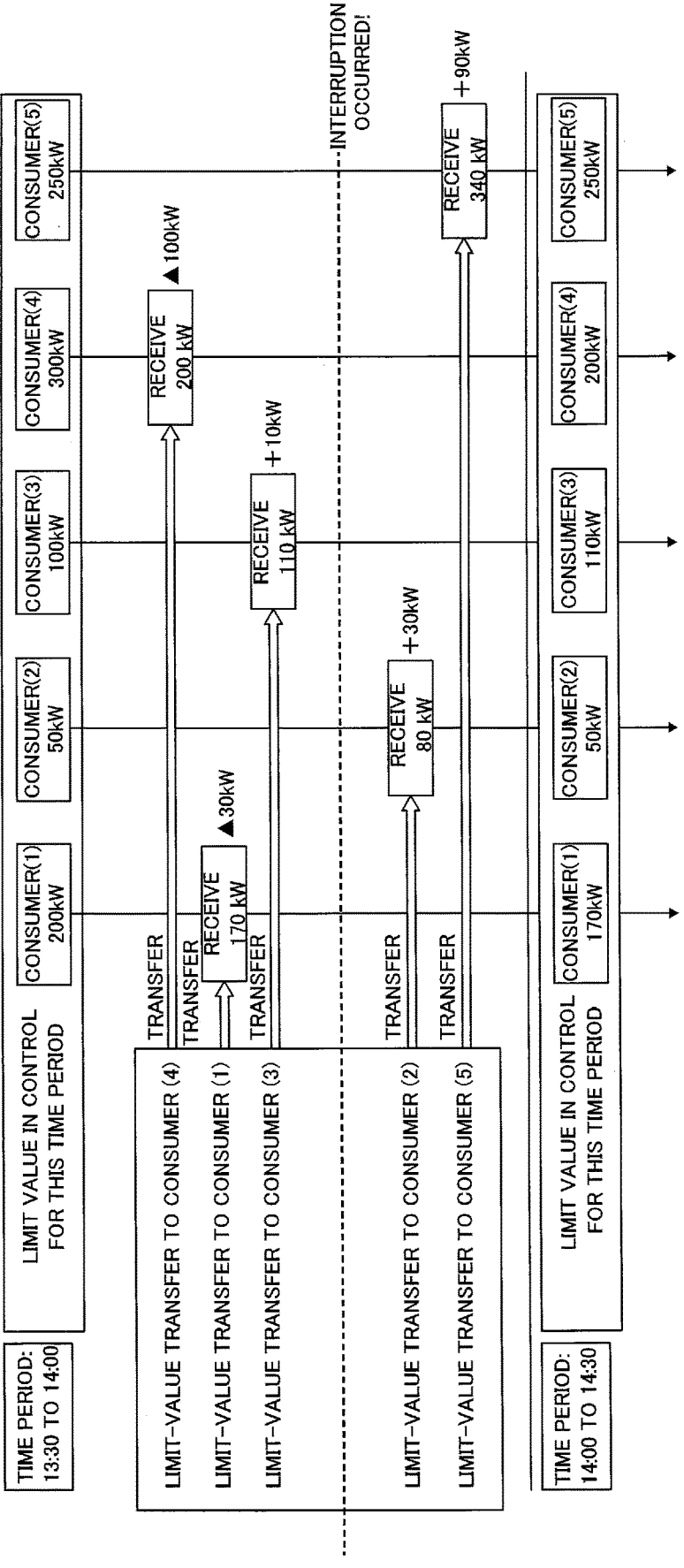
FIG. 10 is a diagram illustrating an example of interruption of communication during transmission of control information.

FIG. 10 is a diagram illustrating an example of interruption of communication during transmission of control information. In the example illustrated in FIG. 10, during the transmission of the control information for the second time period illustrated in FIG. 9, the communication is interrupted when the control information of the consumer (3) is transmitted. In this case, for the consumer (1), the consumer (3), and the consumer (4) to which the transmission of the control information for the second time period is completed, the control devices 100 corresponding to the respective consumers control the equipment devices 200 in the second time period in accordance with the acquired control information for the second time period. The limit values in the control during the second time period are limit values included in the acquired control information for the second time period, and are, as illustrated in FIG. 10, 170 kW for the consumer (1), 110 kW for the consumer (3), and 200 kW for the consumer (4).

By contrast, for the consumer (2) and the consumer (5) to which the transmission of the control information for the second time period is not completed, the control devices 100 corresponding to the respective consumers take over the limit values for the immediately preceding, first time period and control the equipment devices 200. Accordingly, as illustrated in FIG. 10, the limit values in the control during the second time period are 50 kW for the consumer (2) and 250 kW for the consumer (5). The control devices 100 that fail to acquire the control information for the corresponding time period (the second time period) take over the limit values for the preceding time period (the first time period). However, the control devices 100 does not need to perform the control itself of the equipment devices 200 in accordance with the control information for the preceding, time period. For example, the control devices 100 may control the equipment devices 200 in accordance with a control method prepared in advance for use in a case where the control devices 100 fail to acquire the control information on condition that the taken over limit values are not exceeded.

In the example described with reference to FIGS. 9 and 10, the order of transmission of control information is defined such that control information having a lower limit value for the target time period than the limit value for the immediately preceding time period is transmitted earlier than control information having a higher limit value for the target time period than the limit value for the immediately preceding time period. In addition, pieces of control information having lower limit values for the target time period than those for the immediately preceding time period are transmitted in order from largest to smallest amount of decrease, and pieces of control information having higher limit values for the target time period than those for the immediately preceding time period are transmitted in order from smallest to largest amount of increase. However, the order of transmission of control information may be any order in which pieces of control information are sequentially transmitted on a consumer-by-consumer basis and, at the time point at which the transmission of the control information of one consumer is completed, the total of the limit values in all the pieces of control information that have been transmitted so far is not larger than the total of the limit values of the corresponding consumers for the immediately preceding time period. Accordingly, several possible examples of the transmission order are conceivable.

For example, in a case where pieces of control information having lower limit values for the target time period than those for the immediately preceding time period are transmitted earlier, the order of transmission of the pieces of control information having lower limit values for the target time period than those for the immediately preceding time period and the order of transmission of the pieces of control information having higher limit values for the target time period than those for the immediately preceding time period do not necessarily depend on the amount of decrease and the amount of increase in the limit value, respectively. Referring to the example of the control information for the second time period in FIGS. 9 and 10, in the illustrated example, the control information of the consumer (1) and the consumer (4) is transmitted earlier, and the control information of the consumer (2), the consumer (3), and the consumer (5) is transmitted later. Accordingly, for example, transmission may be performed in the order of the consumer (1), the consumer (4), the consumer (5), the consumer (3), and the consumer (2).

In addition, the order of transmission of control information may be any order in which, at the time point at which the transmission of the control information of one consumer is completed, the total of the limit values that have been transmitted so far is not larger than the total of the limit values of the corresponding consumers for the immediately preceding time period. Accordingly, the control information to be transmitted first needs to be control information having a lower limit value for the target time period than the limit value for the immediately preceding time period. However, the second and subsequent pieces of control information to be transmitted do not necessarily need to be transmitted such that control information having a lower limit value for the target time period than the limit value for the immediately preceding time period is transmitted earlier. For example, in the example of the control information for the second time period in FIGS. 9 and 10, the transmission may be performed in the order of the consumer (1), the consumer (3), the consumer (4), the consumer (2), and the consumer (5).

In addition, a case where a limit value for the target time period is the same as a limit value for the immediately preceding time period does not affect the method in which, at the time point at which the transmission of the control information of one consumer is completed, the total of the limit values that have been transmitted so far is not larger than the total of the limit values of the corresponding consumers for the immediately preceding time period. Accordingly, the transmission timing of the control information is not particularly limited. As an example, after control information having a lower limit value for the target time period than the limit value for the immediately preceding time period, control information having the same limit value for the target time period as that for the immediately preceding time period may be transmitted earlier than control information having a higher limit value for the target time period than the limit value for the immediately preceding time period.

While an embodiment has been described above, the technical scope of the present disclosure is not limited to the embodiment described above. For example, in the embodiment described above, a limit value is set before the start of the time period during which control based on control information is performed, and the limit value can be adjusted after the start of the time period. Alternatively, instead of a limit value being set before the start of the time period, a limit value may be set in accordance with the operating status of the equipment devices 200 within the time period. In the embodiment described above, the server 300 adjusts the limit value after the start of the time period. Alternatively, the control device 100 may adjust the limit value. In this case, when a plurality of control devices 100 control the equipment devices 200 of all of the consumers included in the group, the control devices 100 may exchange information on the operating status of the equipment devices 200 and adjust the limit values in accordance with the obtained information.

In the embodiment described above, if the transmission of control information for the target time period is interrupted, the equipment devices 200 are controlled using a limit value for the immediately preceding time period. Alternatively, as long as the total value of the limit values of the entire group for the immediately preceding time period is not exceeded, the limit values for a time period other than the immediately preceding time period, which are stored in the storage unit 130 of the control device 100, may be used to control the equipment devices 200. Various modifications and substitutions of configurations that are made without departing from the scope of the technical idea of the present disclosure are included in the present disclosure.

Here, the embodiment described above may be implemented as follows. A power control system of the present disclosure is a power control system for performing power control such that a target power set for a group including a plurality of consumers is not exceeded, the system including a server 300 that generates pieces of control information of equipment devices 200 of the consumers; and a control device 100 that controls power usage of the equipment devices 200 of the consumers in accordance with the generated pieces of control information. The server 300 includes a limit value setting unit 330 and a control information generation unit 340 that set, for each of predetermined time periods, limit values, each for power usage of one of the consumers included in the group, such that the target power of the group is not exceeded, and generate the pieces of control information, each for an equipment device 200 of one of the consumers, including the limit values; and a transmission control unit 380 that transmits the generated pieces of control information to the control device 100 that controls the equipment devices 200 of the consumers before a start of a time period in which control is performed by the control device 100. The control device 100 includes a control information acquisition unit 110 that receives the pieces of control information of the equipment devices 200 for each of the time periods, the equipment devices 200 being to be controlled by the control device 100; a storage unit 130 that holds the received pieces of control information; and a control instruction generation unit 140 and a control instruction output unit 150 that control, for each of the time periods, the power usage of the equipment devices 200 of the consumers in accordance with pieces of control information for the time period among the pieces of control information held in the storage unit 130.

This configuration can reduce failures caused by communication between a server and a consumer facility to control (limit) the power usage of a group including a plurality of consumers.

The control information generation unit 340 of the server 300 may generate, for each predetermined unit period, the pieces of control information for a plurality of time periods included in the unit period, the transmission control unit 380 of the server 300 may transmit, before the unit period starts, the pieces of control information for each of the time periods in the unit period, and the control information acquisition unit 110 and the storage unit 130 of the control device 100 may receive and hold, before the unit period starts, the pieces of control information for each of the time periods in the unit period.

This configuration allows the control information for the unit period to be transmitted to the control device 100 in advance, making it possible to reduce failures caused by communication between the server and the consumer facility.

Further, the control information generation unit 340 of the server 300 may set limit values of the plurality of consumers included in the group for a time period such that a sum of differences, for consumers for which limit values are set to be higher for the time period than limit values for a time period immediately preceding the time period, between the limit values for the time period and the limit values for the time period immediately preceding the time period is not larger than a sum of differences, for consumers for which limit values are set to be lower for the time period than limit values for the time period immediately preceding the time period, between the limit values for the time period and the limit values for the time period immediately preceding the time period.

This configuration can prevent a total value of the limit values of the consumers included in the group from exceeding the target power of the group.

Further, the transmission control unit 380 of the server 300 may transmit pieces of control information for respective equipment devices 200 of the plurality of consumers included in the group regarding a time period to the control device 100 that controls the equipment devices 200 to be controlled by using the pieces of control information, such that pieces of control information for decreasing limit values for the time period from limit values for a time period immediately preceding the time period are transmitted earlier than pieces of control information for increasing limit values for the time period from limit values for the time period immediately preceding the time period.

This configuration can prevent a total value of the limit values of the consumers included in the group from exceeding the target power of the group even if a communication failure occurs during communication of control information between the server and the consumer facility.

Further, the transmission control unit 380 of the server 300 may transmit the pieces of control information for decreasing the limit values for the time period from the limit values for the time period immediately preceding the time period, in descending order of an amount of decrease, and transmit the pieces of control information for increasing the limit values for the time period from the limit values for the time period immediately preceding the time period, in ascending order of an amount of increase.

This configuration can prevent a total value of the limit values of the consumers included in the group from exceeding the target power of the group even if a communication failure occurs during communication of control information sequentially transmitted for each consumer between the server and the consumer facility.

Further, the transmission control unit 380 of the server 300 may transmit pieces of control information for respective equipment devices 200 of the plurality of consumers included in the group regarding a time period to the control device 100 that controls the equipment devices 200 to be controlled by using the pieces of control information, such that the pieces of control information are sequentially transmitted for each of the consumers included in the group in an order in which, at a time point at which transmission of a piece of control information of a consumer among the consumers included in the group is completed, a total of limit values in all pieces of control information that have been transmitted so far is not larger than a total of limit values of corresponding consumers for a time period immediately preceding the time period. This configuration can prevent a total value of the limit values of the consumers included in the group from exceeding the target power of the group even if a communication failure occurs during communication of control information sequentially transmitted for each consumer between the server and the consumer facility at the time point at which the transmission of control information for some of the consumers included in the group is completed.

Further, when pieces of control information for a time period are not received before the time period starts, the control instruction generation unit 140 of the control device 100 may control the equipment devices 200 such that limit values in pieces of control information for a time period preceding the time period are not exceeded, the pieces of control information for the time period preceding the time period being held in the storage unit 130.

This configuration can control the equipment devices 200 so as to prevent a total value of the limit values of the consumers included in the group from exceeding the target power of the group even if a communication failure occurs during communication of control information between the server and the consumer facility.

A control device 100 of the present disclosure is a control device 100 included in a system for performing power control such that a target power set for a group including a plurality of consumers is not exceeded, the control device 100 controlling power usage of an equipment device 200 of a consumer in the group. The control device 100 includes a control information acquisition unit 110 that receives control information for an equipment device 200 of each of the consumers included in the group for each of predetermined time periods, the control information including a limit value of power usage of the consumer, the limit value being set such that the target power of the group is not exceeded; a storage unit 130 that stores the control information received by the control information acquisition unit 110; and a control instruction generation unit 140 and a control instruction output unit 150 that control, for each of the time periods, the power usage of the equipment device 200 of the consumer in accordance with control information for the time period within control information stored in the storage unit 130.

This configuration can control the equipment device 200 to control (limit) the power usage of a group including a plurality of consumers even if a communication failure occurs during communication of control information between a server and a consumer facility.

When control information for a time period is not received before the time period starts, the control instruction generation unit 140 may control the equipment device 200 such that a limit value in control information for a time period preceding the time period is not exceeded, the control information for the time period preceding the time period being held in the storage unit 130.

This configuration can control the equipment devices 200 so as to prevent a total value of the limit values of the consumers included in the group from exceeding the target power of the group even if a communication failure occurs during communication of control information between the server and the consumer facility.

A program of the present disclosure is a program for causing a computer for controlling a control device 100 included in a system for performing power control such that a target power set for a group including a plurality of consumers is not exceeded, the control device 100 controlling power usage of an equipment device 200 of a consumer in the group, to function as a control information acquisition unit 110 that receives control information for an equipment device 200 of each of the consumers included in the group for each of predetermined time periods, the control information including a limit value of power usage of the consumer, the limit value being set such that the target power of the group is not exceeded; and a control instruction generation unit 140 and a control instruction output unit 150 that control, for each of the time periods, the power usage of the equipment device 200 of the consumer in accordance with control information for the time period within control information stored in a storage unit 130 that stores the control information received by the control information acquisition unit 110.

A computer having installed therein the program can reduce failures caused by communication between a server and a consumer facility to control (limit) the power usage of a group including a plurality of consumers.

REFERENCE SIGNS LIST

100 control device
110 control information acquisition unit
120 operation information acquisition unit
130 storage unit
140 control instruction generation unit
150 control instruction output unit
160 operation information output unit
200 equipment device
210 acceptance unit
220 operation control unit
230 output unit
300 server
310 group management unit
320 first prediction unit
330 limit value setting unit
340 control information generation unit
350 second prediction unit
360 actual result information acquisition unit
370 limit value adjustment unit
380 transmission control unit

The invention claimed is:

1. A power control system for performing power control such that a target power set for a group including a plurality of consumers is not exceeded, the system comprising:
   a control information generation server that generates pieces of control information of equipment devices of the consumers; and a control device that controls power usage of the equipment devices of the consumers in accordance with the generated pieces of control information, wherein the control information generation server includes a first processor, wherein the first processor is configured to: set, for each of predetermined time periods, limit values, each for power usage of one of the consumers included in the group, such that the target power of the group is not exceeded, and generate the pieces of control information, each for an equipment device of one of the consumers, including the limit values;

transmit the generated pieces of control information to the control device that controls the equipment devices of the consumers before a start of a time period in which control is performed by the control device, and the control device includes a second processor having a storage that holds the received pieces of control information, wherein the second processor is configured to:

receive the pieces of control information of the equipment devices for each of the time periods, the equipment devices being to be controlled by the control device; and control for each of the time periods, the power usage of the equipment devices of the consumers in accordance with pieces of control information for the time period among the pieces of control information held in the storage, wherein the first processor is further configured to transmit pieces of control information for respective equipment devices of the plurality of consumers included in the group for a time period to the control device that controls the equipment devices to be controlled by using the pieces of control information, wherein a first group of the equipment devices receives the pieces of control information for decreasing the limit values for the time period compared with the limit values for a time period immediately preceding the time period, a second group of the equipment devices receives the pieces of control information for increasing the limit values for the time period compared with the limit values for the time period immediately preceding the time period, and the pieces of control information for respective equipment devices are transmitted to the first group of the equipment devices earlier than to the second group of the equipment devices.

2. The power control system according to claim 1, wherein the first processor is further configured to:

generate, for each predetermined unit period, the pieces of control information for a plurality of time periods included in the unit period; and transmit, before the unit period starts, the pieces of control information for each of the time periods in the unit period; and the second processor is further configured to receive and hold, before the unit period starts, the pieces of control information for each of the time periods in the unit period.

3. The power control system according to claim 1, wherein the first processor is further configured to:

set limit values of the plurality of consumers included in the group for a time period such that a sum of differences, for consumers for which limit values are set to be higher for the time period than limit values for a time period immediately preceding the time period, between the limit values for the time period and the limit values for the time period immediately preceding the time period is not larger than a sum of differences, for consumers for which limit values are set to be lower for the time period than limit values for the time period immediately preceding the time period, between the limit values for the time period and the limit values for the time period immediately preceding the time period.

4. The power control system according to claim 1, wherein the first processor is further configured to transmit the pieces of control information for decreasing the limit values for the time period compared with the limit values for the time period immediately preceding the time period, in descending order of an amount of decrease, and transmit the pieces of control information for increasing the limit values for the time period compared with the limit values for the time period immediately preceding the time period, in ascending order of an amount of increase.

5. The power control system according to claim 1, wherein the first processor is further configured to transmit pieces of control information for respective equipment devices of the plurality of consumers included in the group for a time period to the control device that controls the equipment devices to be controlled by using the pieces of control information, such that the pieces of control information are sequentially transmitted for each of the consumers included in the group in an order in which, at a time point at which transmission of a piece of control information of a consumer among the consumers included in the group is completed, a total of limit values in all pieces of control information that have been transmitted so far is not larger than a total of limit values of corresponding consumers for a time period immediately preceding the time period.

6. The power control system according to claim 1, wherein when pieces of control information for a time period are not received before the time period starts, the second processor is configured to control the equipment devices such that limit values in pieces of control information for a time period preceding the time period are not exceeded, the pieces of control information for the time period preceding the time period being held in the storage.

7. A power control device included in a system for performing power control such that a target power set for a group including a plurality of consumers is not exceeded, the power control device controlling power usage of an equipment device of a consumer in the group, the power control device comprising a processor having a storage, wherein the processor is configured to:

receive control information for an equipment device of each of the consumers included in the group for each of predetermined time periods, the control information including a limit value of power usage of the consumer, the limit value being set such that the target power of the group is not exceeded;

store the control information received in the storage; and control, for each of the time periods, the power usage of the equipment device of the consumer in accordance with control information for the time period within control information stored in the storage, wherein the processor is further configured to transmit pieces of control information for respective equipment devices of the plurality of consumers included in the group for a time period to the power control device that controls the equipment devices to be controlled by using the pieces of control information, wherein a first group of the equipment devices receives the pieces of control information for decreasing the limit values for the time period compared with the limit values for a time period immediately preceding the time period, a second group of the equipment devices receives the pieces of control information for increasing the limit values for the time period compared with the limit values for the time period immediately preceding the time period, and the pieces of control information for respective equipment devices are transmitted to the first group of the equipment devices earlier than to the second group of the equipment devices.

8. The power control device according to claim 7, wherein when control information for a time period is not received before the time period starts, the processor is further configured to control the equipment device such that a limit value in control information for a time period preceding the time period is not exceeded, the control information for the time period preceding the time period being held in the storage.

9. A non-transitory computer readable medium storing a program for causing a computer for controlling a power control device included in a system for performing power control such that a target power set for a group including a plurality of consumers is not exceeded, the power control device controlling power usage of an equipment device of a consumer in the group, to perform functions of:

receiving control information for an equipment device of each of the consumers included in the group for each of predetermined time periods, the control information including a limit value of power usage of the consumer, the limit value being set such that the target power of the group is not exceeded;

controlling, for each of the time periods, the power usage of the equipment device of the consumer in accordance with control information for the time period within control information stored in a storage of the computer that stores the control information received; and transmitting pieces of control information for respective equipment devices of the plurality of consumers included in the group for a time period to the power control device that controls the equipment devices to be controlled by using the pieces of control information, wherein a first group of the equipment devices receives the pieces of control information for decreasing the limit values for the time period compared with the limit values for a time period immediately preceding the time period, a second group of equipment devices receives the pieces of control information for increasing the limit values for the time period compared with the limit values for the time period immediately preceding the time period, and the pieces of control information for respective equipment devices are transmitted to the first group of the equipment devices earlier than to the second group of the equipment devices.

\* \* \* \* \*